United States Patent
Zhao et al.

(10) Patent No.: US 8,634,344 B2
(45) Date of Patent: Jan. 21, 2014

(54) DYNAMIC INTERNET PROTOCOL ADDRESSING SOLUTIONS WITH NETWORK-BASED MOBILITY

(75) Inventors: Fan Zhao, San Jose, CA (US); Stefano Faccin, Fremont, CA (US); Ameya Damle, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 1199 days.

(21) Appl. No.: 12/185,331

(22) Filed: Aug. 4, 2008

(65) Prior Publication Data

US 2009/0040964 A1 Feb. 12, 2009

Related U.S. Application Data

(60) Provisional application No. 60/954,119, filed on Aug. 6, 2007, provisional application No. 60/973,258, filed on Sep. 18, 2007.

(51) Int. Cl.
*H04W 80/04* (2009.01)
*H04W 84/12* (2009.01)
*H04W 36/18* (2009.01)

(52) U.S. Cl.
USPC ............................ 370/328; 370/331; 370/338

(58) Field of Classification Search
USPC ........................................................ 370/328
See application file for complete search history.

(56) References Cited

U.S. PATENT DOCUMENTS

| | | | | |
|---|---|---|---|---|
| 6,721,297 B2* | 4/2004 | Korus et al. | | 370/338 |
| 8,102,815 B2* | 1/2012 | Krishnan | | 370/331 |
| 8,289,862 B2* | 10/2012 | Xia et al. | | 370/252 |
| 8,446,875 B2* | 5/2013 | Taniuchi et al. | | 370/331 |
| 2002/0031108 A1* | 3/2002 | Inoue | | 370/338 |
| 2002/0048266 A1* | 4/2002 | Choi et al. | | 370/331 |
| 2002/0191593 A1* | 12/2002 | O'Neill et al. | | 370/338 |
| 2003/0095522 A1* | 5/2003 | Korus et al. | | 370/338 |
| 2003/0137961 A1* | 7/2003 | Tsirtsis et al. | | 370/338 |
| 2003/0193952 A1* | 10/2003 | O'Neill | | 370/331 |
| 2003/0224758 A1* | 12/2003 | O'Neill et al. | | 455/411 |
| 2004/0013099 A1* | 1/2004 | O'Neill | | 370/338 |
| 2004/0023653 A1* | 2/2004 | O'Neill | | 455/432.1 |
| 2004/0029584 A1* | 2/2004 | Le et al. | | 455/432.1 |

(Continued)

OTHER PUBLICATIONS

Proxy Mobile IPv6 indication and discovery; draft-damic-netlmm-pmip6-ind-discover-01.txt; D. Damic, D. Premec, B. Patil, M. Sahasrabudhe, Nokia Siemens Networks; Jun. 19, 2007; 14 pages.

(Continued)

*Primary Examiner* — Ian N Moore
*Assistant Examiner* — Jenee Alexander

(57) ABSTRACT

A media access gateway includes a wireless network interface, an address assignment module, a proxy mobility agent module, and a profile module. The wireless network interface establishes a link with a wireless terminal. The address assignment module receives an address request message, including a mobility signal, from the wireless terminal. The proxy mobility agent module selectively transmits a proxy binding update to a local mobility anchor, and receives a proxy binding acknowledgement. The address assignment module transmits an address assignment message to the wireless terminal in response to the mobility signal indicating support or preference for proxy mobility. The address assignment message is based on address information in the proxy binding acknowledgement. The profile module retrieves a profile for the wireless terminal from a server. The address assignment module selectively transmits a second address assignment message to the wireless terminal based on the address information in the profile.

20 Claims, 18 Drawing Sheets

(56) References Cited

U.S. PATENT DOCUMENTS

| | | | | |
|---|---|---|---|---|
| 2004/0047348 | A1* | 3/2004 | O'Neill | 370/389 |
| 2004/0148428 | A1* | 7/2004 | Tsirtsis | 709/238 |
| 2005/0078633 | A1* | 4/2005 | Watanabe et al. | 370/331 |
| 2006/0209759 | A1* | 9/2006 | Vesterinen | 370/331 |
| 2006/0258356 | A1* | 11/2006 | Maxwell et al. | 455/436 |
| 2006/0274670 | A1* | 12/2006 | Matsumoto | 370/331 |
| 2007/0258427 | A1* | 11/2007 | Shaheen et al. | 370/338 |
| 2007/0268919 | A1* | 11/2007 | Sarikaya et al. | 370/401 |
| 2008/0095118 | A1* | 4/2008 | Cakulev et al. | 370/331 |
| 2008/0176560 | A1* | 7/2008 | Dutta et al. | 455/433 |
| 2008/0186908 | A1* | 8/2008 | O'Neill | 370/328 |
| 2008/0310425 | A1* | 12/2008 | Nath et al. | 370/395.54 |
| 2009/0003297 | A1* | 1/2009 | Xia et al. | 370/338 |
| 2009/0022126 | A1* | 1/2009 | Damle et al. | 370/338 |
| 2009/0290529 | A1* | 11/2009 | Toyokawa et al. | 370/315 |
| 2010/0014445 | A1* | 1/2010 | Hirano et al. | 370/310 |

OTHER PUBLICATIONS

DHCP Option for Home Information Discovery in MIPv6; draft-ietf-mip6-hiopt-05.txt; Hee Jin Jang, Alper Yegin, Samsung; Kuntal Chowdhury, Starent Networks; JinHyeock Choi, Samsung; Jun. 13, 2007; 19 pages.

DHCP Option for Home Information Discovery in MIPv6; draft-ietf-mip6-hiopt-17.txt; Hee Jin Jang, Alper Yegin, Samsung; Kuntal Chowdhury, Starent Networks; JinHyeock Choi, Samsung; May 22, 2008; 21 pages.

Proxy Mobile IPv6; draft-ietf-netlmm-proxymip6-01.txt; S. Gundavelli, K. Leung, Cisco; V. Devarapalli, Azaire Networks; K. Chowdhury, Starent Networks; B. Patil, Nokia Siemens Networks; Jun. 18, 2007; 44 pages.

Client Initiated Selection of Proxy Mobility; draft-krishnan-netlmm-pmip-sel-00; S. Krishnan, Ericson; Jun. 7, 2007; 11 pages.

Neighbor Discovery for IP Version 6 (IPv6); rfc2461.txt; T. Narten, IBM; E. Nordmark, Sun Microsystems; W. Simpson, Daydreamer; Dec. 1998; 93 pages.

IPv6 Stateless Address Autoconfiguration; rfc2462.txt; S. Thomson, Bellcore; T. Narten, IBM; Dec. 1998; 25 pages.

Dynamic Host Configuration Protocol; rfc2131.txt; R. Droms, Bucknell University; Mar. 1997; 45 pages.

Dynamic Host Configuration Protocol for IPv6 (DHCPv6); rfc3315.txt; R. Droms, Ed., Cisco; J. Bound, Hewlett Packard; B. Volz, Ericsson; T. Lemon, Nominum; C. Perkins, Nokia Research Center; M. Carney, Sun Microsystems; Jul. 2003; 101 pages.

IP Mobility Support for IPv4; rfc3344.txt; C Perkins, Ed., Nokia Research Center; Aug. 2002; 99 pages.

Mobility Support in IPv6; rfc3775.txt; D. Johnson, Rice University; C. Perkins, Nokia Research Center; J. Arkko, Ericsson; Jun. 2004; 165 pages.

ANSI/IEEE Std 802.11 First Edition 1999-00-00; Information technology—Telecommunications and information exchange between systems—Local and metropolitan area networks—Specific requirements—Part 11: Wireless LAN Medium Access Control (MAC) and Physical Layer (PHY) specifications; 529 pages.

* cited by examiner

DYNAMIC INTERNET PROTOCOL ADDRESSING SOLUTIONS WITH NETWORK-BASED MOBILITY

CROSS-REFERENCE TO RELATED APPLICATIONS

This application claims the benefit of U.S. Provisional Application No. 60/954,119, filed on Aug. 6, 2007, and U.S. Provisional Application No. 60/973,258, filed on Sep. 18, 2007. The disclosures of the above applications are incorporated herein by reference in their entirety.

FIELD

The subject matter of the present disclosure relates to network-based mobility and more particularly to dynamic internet protocol addressing solutions within a framework of network-based mobility.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Referring now to FIG. 1, a functional block diagram of a wireless communications system is presented. A home network 102 receives packets from and sends packets to a distributed communications system 104, such as the Internet. A wireless terminal 106 wirelessly connects to the home network 102. For example only, the wireless terminal 106 may be a mobile phone, and the home network 102 may be the cellular network of a mobile phone operator.

The wireless terminal 106 is configured to work with the home network 102, and may be unable to connect to the networks of other carriers. In various implementations, the wireless terminal 106 may be able to view content from the distributed communications system 104 via the home network 102. The home network 102 may interconnect with the networks of other service providers and/or core networks.

Referring now to FIG. 2, a functional block diagram of a wireless communications system offering mobility is presented. The home network 102 is connected to one or more visited networks 110. For example only, FIG. 2 depicts three visited networks 110-1, 110-2, and 110-3. In various implementations, the visited networks 110 may be the networks of other service providers, including service providers in other countries.

A mobile wireless terminal 120 includes mobility features that allow the mobile wireless terminal 120 to communicate with the visited networks 110. For example, in FIG. 2, the mobile wireless terminal 120 has established a wireless connection to the visited network 110-1. The mobile wireless terminal 120 includes the code and data used to communicate with the home network 102 via the visited network 110-1. In this way, the mobile wireless terminal 120 can interface with the home network 102 even when connected to one of the visited networks 110. Because the mobile wireless terminal 120 itself includes mobility features, the mobile wireless terminal 120 may be described as supporting client mobile internet protocol (CMIP).

For example, mobile internet protocol (IP) for IP version 6 (IPv6) is described in request for comment (RFC) 3775, titled "Mobility Support in IPv6," the disclosure of which is hereby incorporated by reference in its entirety. Mobile IP for IP version 4 (IPv4) is described in RFC 3344, entitled "IP Mobility Support for IPv4," the disclosure of which is hereby incorporated by reference in its entirety.

Referring now to FIG. 3, a functional block diagram depicts a wireless communications system that provides proxy mobility to the wireless terminal 106. A home network 150 communicates with visited networks 160-1, 160-2, and 160-3. The visited networks 160 provide transparent mobility to wireless terminals, such as the wireless terminal 106, which do not include mobility functionality. This may be referred to as proxy mobile IP (PMIP) or network mobile IP. Proxy mobility in IPv6 is described in an Internet Engineering Task Force (IETF) draft titled "Proxy Mobile IPv6" (published Jun. 18, 2007 and available as "draft-ietf-netlmm-proxymip6-01.txt"), the disclosure of which is hereby incorporated by reference in its entirety.

When the wireless terminal 106 attempts to establish a link with the visited network 160-1, the visited network 160-1 determines the network to which the wireless terminal 106 belongs. In this case, the visited network 160-1 determines that the home network 150 is the appropriate network. The visited network 160-1 then forwards packets from the wireless terminal 106 to the home network 150 and passes packets from the home network 150 to the wireless terminal 106. The wireless terminal 106 can therefore be oblivious to the fact that the wireless terminal 106 is connected to the visited network 160-1 instead of to the home network 150.

Referring now to FIG. 4, a functional block diagram and timeline of an implementation of client mobility is presented. The home network 102 includes a home agent (HA) 180. The HA 180 establishes the logical location of the mobile wireless terminal 120. Packets ultimately destined for the mobile wireless terminal 120 are sent to the HA 180, while packets from the mobile wireless terminal 120 will appear to originate from the location of the HA 180.

The mobile wireless terminal 120 may establish a connection to an access router (AR) 182 within the visited network 110-1. In various implementations, additional ARs (not shown) may be present. The AR 182 may communicate with other networks, including the home network 102.

When the mobile wireless terminal 120 connects to the visited network 110-1, the mobile wireless terminal 120 performs authentication and authorization with the AR 182. This may include communicating with an authentication, authorization, and accounting (AAA) server. The AAA server may retrieve information based on an identifier of the mobile wireless terminal 120, such as a network address identifier, that uniquely identifies the mobile wireless terminal 120. The AAA server may indicate to the AR 182 whether the mobile wireless terminal 120 should be allowed access and what services should be provided.

The mobile wireless terminal 120 receives a local address from the AR 182. Using this address, the mobile wireless terminal 120 can communicate with various network elements, including the HA 180. The mobile wireless terminal 120 transmits a binding update message to the HA 180. The HA 180 allocates a global home address HoA to the mobile wireless terminal 120. The HA 180 may create a binding cache entry that records information about the mobile wireless terminal 120, such as the current address of the mobile wireless terminal 120 and the allocated address HoA.

The HA 180 transmits a binding acknowledgement message to the mobile wireless terminal 120. The binding acknowledgement message includes HoA so that the mobile wireless terminal 120 is aware of its global home address.

Packets sent from other network devices, such as other wireless terminals, are sent to that home address. The HA 180 receives those packets and forwards them to the mobile wireless terminal 120. Similarly, packets from the mobile wireless terminal 120 are first sent to the HA 180. The HA 180 then forwards the packets with a source address of HoA. To allow for packets to be exchanged between the mobile wireless terminal 120 and the HA 180, a tunnel is established between the mobile wireless terminal 120 and the HA 180.

Referring now to FIG. 5, a functional block diagram and timeline of an implementation of proxy mobility is presented. The wireless terminal 106 may establish a connection to a media access gateway (MAG) 190 in the visited network 160-1. In various implementations, additional MAGs (not shown) may be present in the visited network 160-1. The MAG 190 may communicate with other networks, including the home network 150.

Once the wireless terminal 106 connects, the MAG 190 may authenticate the wireless terminal 106 and determine what services the wireless terminal 106 is authorized to access. The wireless terminal 106 then requests an address from the MAG 190. The MAG 190 determines a local mobility anchor (LMA) to which the wireless terminal 106 belongs. For example only, the MAG 190 may consult a home subscriber server (HSS) to determine the appropriate LMA.

The MAG 190 then sends a proxy binding update identifying the wireless terminal 106 to the identified LMA, which in this case is LMA 192, located in the home network 150. The LMA 192 allocates a home address HoA for the wireless terminal 106. The LMA 192 may also create a binding cache entry to record information about the wireless terminal 106. The LMA 192 sends a proxy binding acknowledgement including HoA to the MAG 190.

The MAG 190 and the LMA 192 establish a tunnel for transfer of packets to and from the wireless terminal 106. The MAG 190 then assigns HoA to the wireless terminal 106. When the wireless terminal 106 transmits a packet, the MAG 190 sends that packet through the tunnel to the LMA 192. The LMA 192 then forwards the packet with a source address of HoA. When a packet arrives at the LMA 192 with a destination address of HoA, the LMA 192 sends the packet to the MAG 190 through the tunnel. The MAG 190 then forwards the packets to the wireless terminal 106.

Using this architecture, the wireless terminal 106 can be unaware of the mobility services provided by the MAG 190. As expected, the wireless terminal 106 has been assigned a home address in the home network 150. The wireless terminal 106 therefore does not need to be aware that it is actually connected to the visited network 160-1 instead of to the home network 150.

Referring now to FIGS. 6-8, exemplary message flow diagrams are presented for various methods of obtaining a layer 3 address (e.g., an IP address). In FIG. 6, an example of dynamic host configuration protocol (DHCP) is shown. DHCP may be used to obtain an IPv4 address or an IPv6 address. DHCP for IPv4 is described in RFC 2131, titled "Dynamic Host Configuration Protocol," the disclosure of which is hereby incorporated by reference in its entirety. DHCP for IPv6 is described in RFC 3315, titled "Dynamic Host Configuration Protocol for IPv6 (DHCPv6)," the disclosure of which is hereby incorporated by reference in its entirety.

After a wireless terminal establishes layer 2 connectivity with an access router, the wireless terminal may broadcast a DHCP request. The access router can then provide the wireless terminal with an address via a DHCP reply. In various implementations, a two-stage process may be performed, where two requests and two replies are sent. The initial request may be a discovery message and the initial reply may be an offer message. A subsequent request indicates an acceptance of the offer of the address and a subsequent reply indicates that the access router acknowledges the request. This subsequent reply may provide additional configuration information, such as domain name server (DNS) addresses.

Referring now to FIG. 7, a timeline depicts exemplary stateless IP address autoconfiguration. Stateless autoconfiguration for IPv6 is described in RFC 2462, titled "IPv6 Stateless Autoconfiguration," the disclosure of which is hereby incorporated by reference in its entirety. After the wireless terminal establishes layer 2 connectivity with an access router, the wireless terminal broadcasts a router solicitation message. The access router can then respond with a router advertisement, which includes an address prefix. The prefix may be local to the access router's network or may be globally routable.

The wireless terminal configures a full IPv6 address based on the provided prefix. For example only, a provided prefix may be a 64-bit value, and the wireless terminal creates a 128-bit IPv6 address using the prefix and a 64-bit value based on an interface identifier of the wireless terminal. For example only, the interface identifier may include a media access control (MAC) address.

The wireless terminal may then verify that the created address is unique, at least within the access router's network. The wireless terminal may determine uniqueness by broadcasting a neighbor discovery message that includes the created address. If no neighbors respond, the wireless terminal assumes that no other network node is using the created address. Neighbor discovery is described in RFC 2461, titled "Neighbor Discovery for IP Version 6 (IPv6)," the disclosure of which is hereby incorporated by reference in its entirety.

Referring now to FIG. 8, an exemplary message diagram depicts a scenario where the wireless terminal attempts to use stateless address autoconfiguration but the access router requires the use of DHCP. After layer 2 connectivity is established, the wireless terminal broadcasts a router solicitation message. The access router responds with a router advertisement message indicating that DHCP is required. For example only, this may be indicated by setting an 'M' flag or an 'O' flag in the router advertisement message. In order to obtain a layer 3 address, the wireless terminal responds by broadcasting a DHCP request. The access router can then assign an address to the wireless terminal and provide that address to the wireless terminal in a DHCP reply.

SUMMARY

A media access gateway comprises a wireless network interface, an address assignment module, and a proxy mobility agent module. The wireless network interface establishes a wireless link with a wireless terminal. The address assignment module receives an address request message, which includes a mobility signal from the wireless terminal. The proxy mobility agent module selectively transmits a proxy binding update to a local mobility anchor and receives a proxy binding acknowledgement from the local mobility anchor. The address assignment module selectively transmits an address assignment message to the wireless terminal when the mobility signal indicates proxy mobility. The address assignment message is based on address information in the proxy binding acknowledgement.

The address request message comprises at least one of a dynamic host configuration protocol (DHCP) message and a router solicitation message. The address assignment message comprises at least one of a DHCP message and a router advertisement message. The media access gateway further comprises a profile module that retrieves a profile corresponding to the wireless terminal from a server. When the profile includes address information for the wireless terminal, the address assignment module transmits a second address assignment message to the wireless terminal based on the address information in the profile.

The proxy mobility agent module omits transmitting the address assignment message when the address information in the proxy binding acknowledgement matches the address information in the profile. The proxy mobility agent module determines an address of the local mobility anchor from the profile. The address assignment module receives a second address request message including a mobility request signal prior to receiving the address request message. After receiving the second address request message, the address assignment module transmits a second address assignment message to the wireless terminal. The second address assignment message includes a mobility availability signal.

The address request message includes an extended access point name (APN) field. The extended APN field includes the mobility signal and an APN that identifies a packet data network connected to the local mobility agent. The address assignment message includes an extended access point name (APN) field. The extended APN field includes a mobility availability signal and an APN that identifies a packet data network connected to the local mobility agent.

A communications system comprises the media access gateway of and a wireless terminal, which comprises a second wireless network interface and an address determination module. The address determination module transmits the address request message via the second wireless network interface and receives the address assignment message via the second wireless network interface. The wireless terminal further comprises a third wireless network interface. The address determination module includes a same address signal in the address request message. The same address signal indicates that the second and third wireless network interfaces can be assigned a single address. The proxy mobility agent module forwards the same address signal to the local mobility anchor.

A media access gateway comprises wireless network interfacing means for establishing a wireless link with a wireless terminal; address assignment means for receiving an address request message, the address request message including a mobility signal from the wireless terminal; and proxy mobility agent (PMA) means for selectively transmitting a proxy binding update to a local mobility anchor and receiving a proxy binding acknowledgement from the local mobility anchor. The address assignment means selectively transmits an address assignment message to the wireless terminal when the mobility signal indicates proxy mobility. The address assignment message is based on address information in the proxy binding acknowledgement.

The address request message comprises at least one of a dynamic host configuration protocol (DHCP) message and a router solicitation message; and the address assignment message comprises at least one of a DHCP message and a router advertisement message. The media access gateway further comprises profile means for retrieving a profile corresponding to the wireless terminal from a server. When the profile includes address information for the wireless terminal, the address assignment means transmits a second address assignment message to the wireless terminal based on the address information in the profile.

The PMA means omits transmitting the address assignment message when the address information in the proxy binding acknowledgement matches the address information in the profile. The PMA means determines an address of the local mobility anchor from the profile. The address assignment means receives a second address request message including a mobility request signal prior to receiving the address request message. After receiving the second address request message, the address assignment means transmits a second address assignment message to the wireless terminal. The second address assignment message includes a mobility availability signal.

The address request message includes an extended access point name (APN) field. The extended APN field includes the mobility signal and an APN that identifies a packet data network connected to the local mobility agent. The address assignment message includes an extended access point name (APN) field. The extended APN field includes a mobility availability signal and an APN that identifies a packet data network connected to the local mobility agent.

A communications system comprises the media access gateway and a wireless terminal, which comprises second wireless network interfacing means for establishing the wireless link with the media access gateway and address determination means for transmitting the address request message via the second wireless network interfacing means and for receiving the address assignment message via the second wireless network interfacing means.

The wireless terminal further comprises third wireless network interfacing means for establishing a second wireless link. The address determination means includes a same address signal in the address request message. The same address signal indicates that the second and third wireless network interfacing means can be assigned a single address. The PMA means forwards the same address signal to the local mobility anchor.

A method comprises establishing a wireless link with a wireless terminal; receiving an address request message, the address request message including a mobility signal from the wireless terminal; selectively transmitting a proxy binding update to a local mobility anchor; receiving a proxy binding acknowledgement from the local mobility anchor; and selectively transmitting an address assignment message to the wireless terminal when the mobility signal indicates proxy mobility. The address assignment message is based on address information in the proxy binding acknowledgement.

The address request message comprises at least one of a dynamic host configuration protocol (DHCP) message and a router solicitation message; and the address assignment message comprises at least one of a DHCP message and a router advertisement message. The method further comprises retrieving a profile corresponding to the wireless terminal from a server. The method further comprises when the profile includes address information for the wireless terminal, transmitting a second address assignment message to the wireless terminal based on the address information in the profile.

The method further comprises omitting transmitting the address assignment message when the address information in the proxy binding acknowledgement matches the address information in the profile. The method further comprises determining an address of the local mobility anchor from the profile. The method further comprises receiving a second address request message including a mobility request signal prior to receiving the address request message. The method further comprises after receiving the second address request message, transmitting a second address assignment message to the wireless terminal. The second address assignment message includes a mobility availability signal.

The address request message includes an extended access point name (APN) field. The extended APN field includes the mobility signal and an APN that identifies a packet data network connected to the local mobility agent. The address assignment message includes an extended access point name (APN) field. The extended APN field includes a mobility availability signal and an APN that identifies a packet data network connected to the local mobility agent. The method further comprises including a same address signal in the address request message. The same address signal indicates that multiple wireless network interfaces of the wireless terminal can be assigned a single address; and forwarding the same address signal to the local mobility anchor.

A computer program stored on a computer-readable medium for use by a processor, where the computer program comprises establishing a wireless link with a wireless terminal; receiving an address request message, the address request message including a mobility signal from the wireless terminal; selectively transmitting a proxy binding update to a local mobility anchor; receiving a proxy binding acknowledgement from the local mobility anchor; and selectively transmitting an address assignment message to the wireless terminal when the mobility signal indicates proxy mobility. The address assignment message is based on address information in the proxy binding acknowledgement.

The address request message comprises at least one of a dynamic host configuration protocol (DHCP) message and a router solicitation message; and the address assignment message comprises at least one of a DHCP message and a router advertisement message. The computer program further comprises retrieving a profile corresponding to the wireless terminal from a server. The computer program further comprises when the profile includes address information for the wireless terminal, transmitting a second address assignment message to the wireless terminal based on the address information in the profile.

The computer program further comprises omitting transmitting the address assignment message when the address information in the proxy binding acknowledgement matches the address information in the profile. The computer program further comprises determining an address of the local mobility anchor from the profile. The computer program further comprises receiving a second address request message including a mobility request signal prior to receiving the address request message. The computer program further comprises after receiving the second address request message, transmitting a second address assignment message to the wireless terminal. The second address assignment message includes a mobility availability signal.

The address request message includes an extended access point name (APN) field. The extended APN field includes the mobility signal and an APN that identifies a packet data network connected to the local mobility agent. The address assignment message includes an extended access point name (APN) field. The extended APN field includes a mobility availability signal and an APN that identifies a packet data network connected to the local mobility agent. The computer program further comprises including a same address signal in the address request message. The same address signal indicates that multiple wireless network interfaces of the wireless terminal can be assigned a single address; and forwarding the same address signal to the local mobility anchor.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
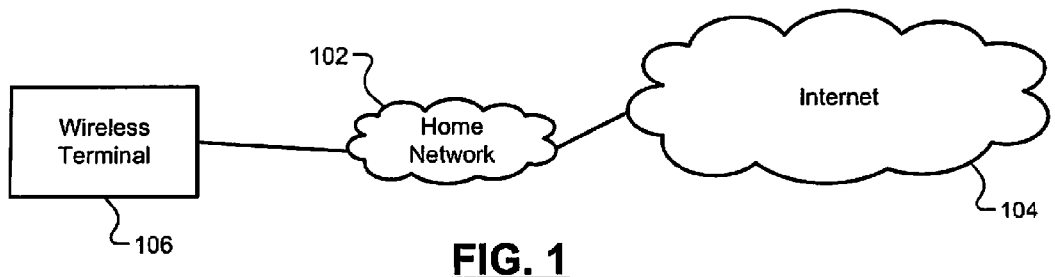
FIG. 1 is a functional block diagram of a wireless communications system according to the prior art.
Figure 2:
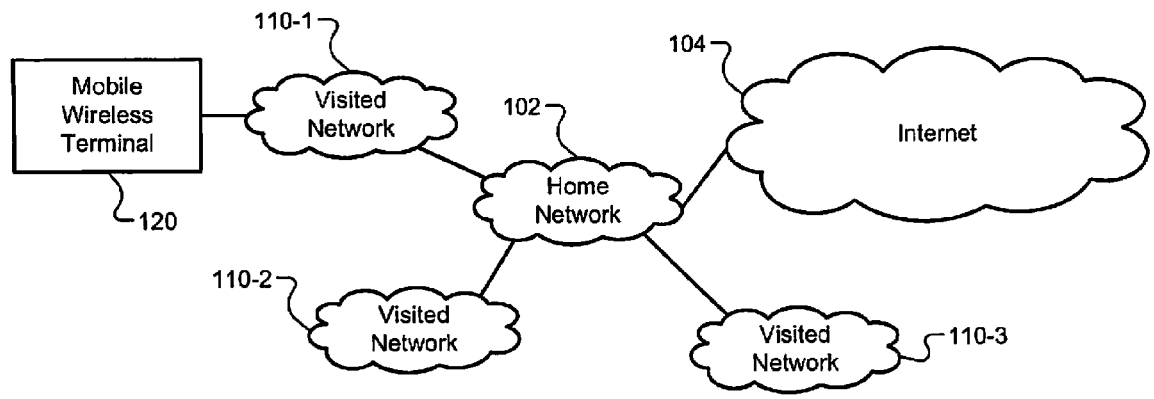
FIG. 2 is a functional block diagram of a wireless communications system offering mobility according to the prior art.
Figure 3:
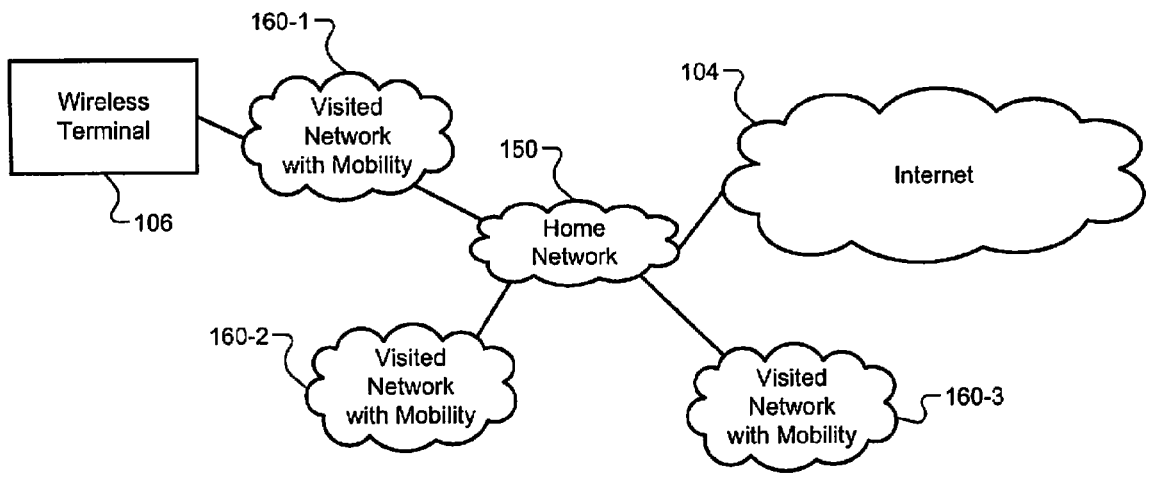
FIG. 3 is a functional block diagram of a wireless communications system according to the prior art that provides proxy mobility to a wireless terminal.
Figure 4:
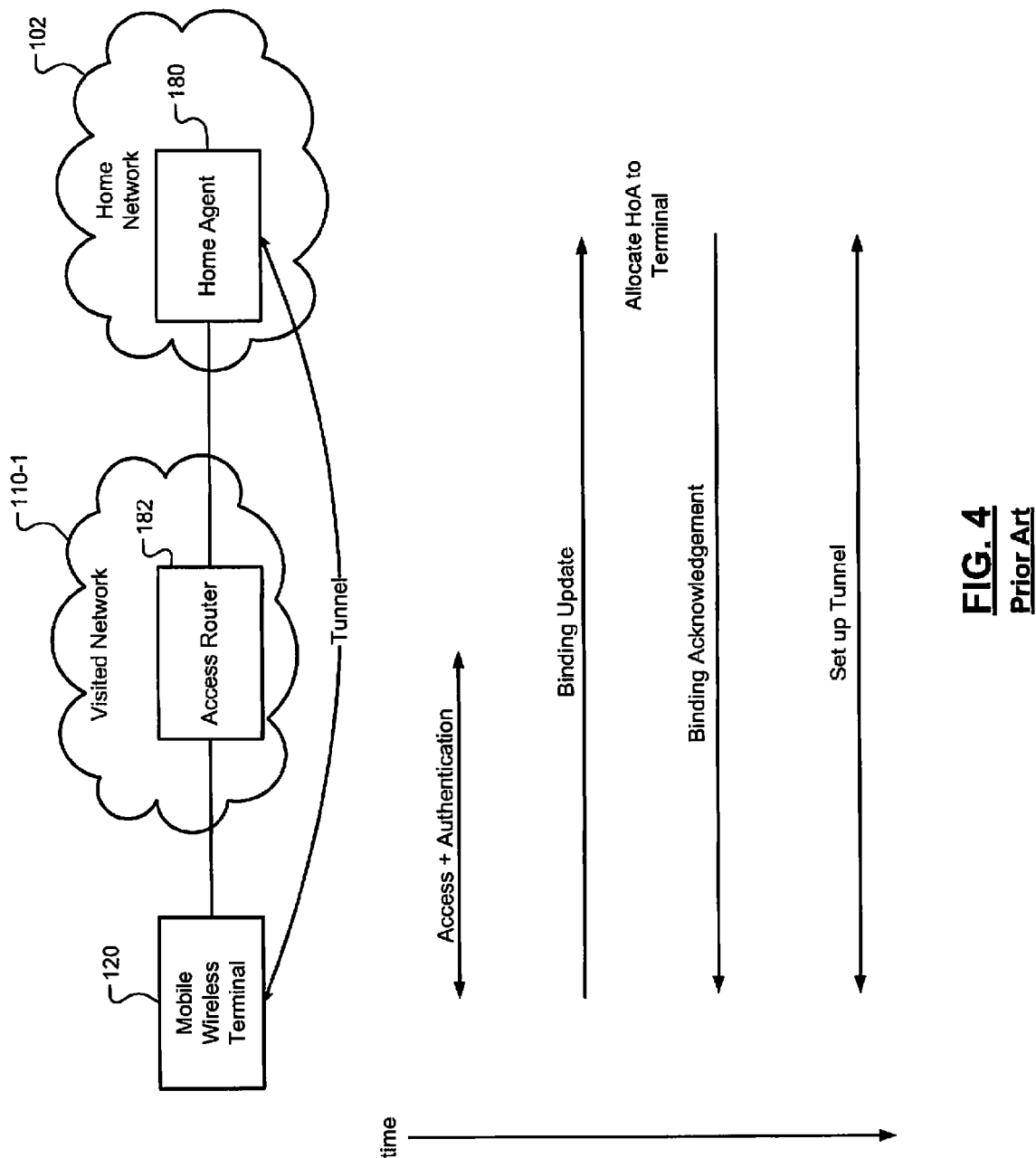
FIG. 4 is a functional block diagram and timeline of an implementation of client mobility according to the prior art.
Figure 5:
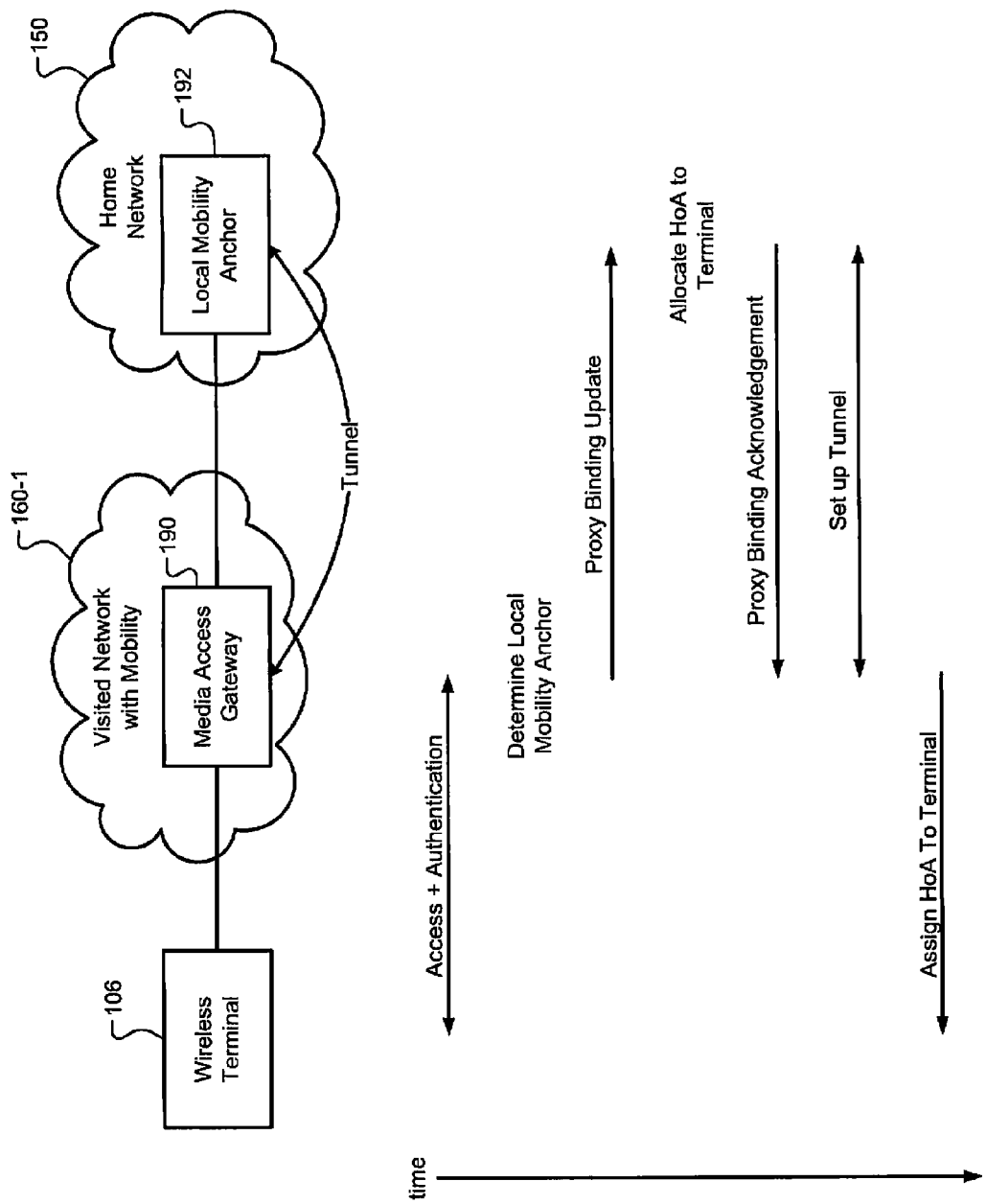
FIG. 5 is a functional block diagram and timeline of an implementation of proxy mobility according to the prior art.
Figure 6:
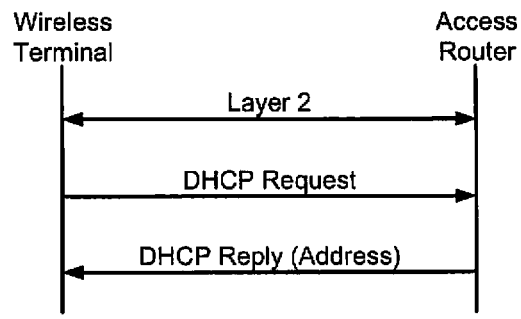
FIGS. 6-8 are exemplary message flow diagrams for various methods of obtaining a layer 3 address according to the prior art.
Figure 7:
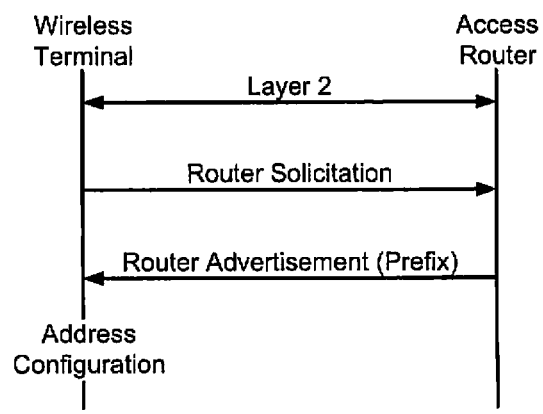
Figure 8:
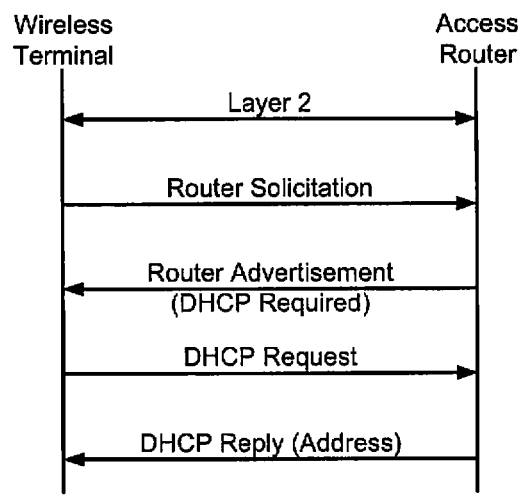

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When a wireless terminal attaches to a visited network, the wireless terminal may not know which types of mobility the visited network supports. For example, mobility types may include proxy mobile IP (PMIP) and client mobile IP (CMIP). Similarly, the visited network may not be aware of the mobility capabilities of the wireless terminal.

Further, if the wireless terminal supports multiple mobility types, the visited network may not know which mobility type the wireless terminal prefers. The mobility types that the visited network allows for the wireless terminal may depend upon a profile corresponding to the wireless terminal and/or to an agreement between the visited network and a home network of the wireless terminal.

According to the principles of the present disclosure, information regarding mobility preferences and capabilities can be transmitted between the wireless terminal and the visited network. For example, a mobility signal may be sent from the wireless terminal to the visited network indicating what mobility types the wireless terminal supports and which mobility types are preferred. The visited network may send a mobility availability signal to the wireless terminal indicating what mobility types are supported by the visited network and allowed for the wireless terminal.

For example only, these mobility preferences and capabilities may be included in address configuration messages. In various implementations, address configuration messages are used to configure a layer 3 address when a node, like the wireless terminal, connects to a network.

Address configuration messages may include address request messages and address assignment messages. For example only, router solicitation and router advertisement messages may serve as address request and address assignment messages, respectively, when stateless address autoconfiguration is used. For example only, dynamic host configuration protocol (DHCP) messages may serve as address request and address assignment messages when stateful address configuration is used. DHCP solicit, discover, and request messages may serve as address request messages. DHCP reply, advertise, acknowledge, and offer messages may serve as address assignment messages.

As described above, when using CMIP, the visited network provides a care-of address to the wireless terminal that the wireless terminal uses to directly establish a connection with the home network. When using PMIP, the visited network provides transparent tunneling of packets between the wireless terminal and the home network. Therefore, if a wireless terminal does not or can not provide mobility information to the visited network, the visited network may use PMIP by default.

Figure 9:
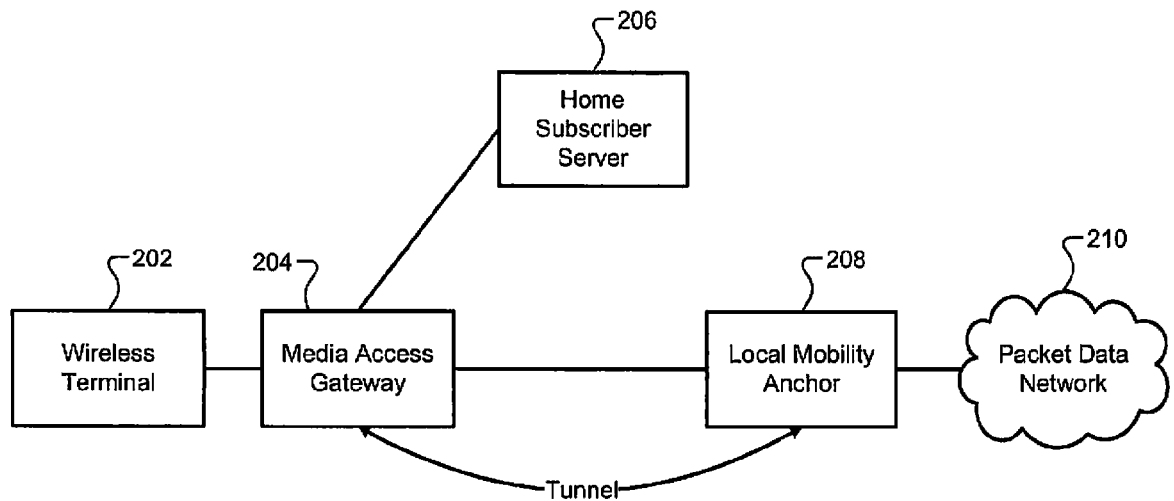
FIG. 9 is a functional block diagram of an exemplary communications system according to the principles of the present disclosure.

Referring now to FIG. 9, a functional block diagram of an exemplary communications system is presented. A wireless terminal 202 connects to a media access gateway (MAG) 204. After establishing layer 2 connectivity with the MAG 204, the wireless terminal 202 requests a layer 3 address.

The MAG 204 may access a profile associated with the wireless terminal 202. The profile may be stored in a home subscriber server (HSS) 206. The profile may indicate which mobility types should be offered to the wireless terminal 202. The profile may also include home address information and local mobility anchor address information. As described in more detail below, the wireless terminal 202 and the MAG 204 exchange information regarding mobility capabilities and preferences.

If the MAG 204 decides to provide PMIP to the wireless terminal 202, the MAG 204 sends a proxy binding update to a local mobility anchor (LMA) 208. The address of the LMA 208 may have been obtained from the HSS 206. The LMA 208 responds with a proxy binding acknowledgement and the MAG 204 sets up a tunnel to the LMA 208. The LMA 208 communicates with a packet data network 210. Packets from the wireless terminal 202 are encapsulated by the MAG 204 and tunneled to the LMA 208. They are then decapsulated and sent to the packet data network 210. Similarly, packets from the packet data network 210 are encapsulated by the LMA 208 and tunneled to the MAG 204. The packets are then decapsulated and sent to the wireless terminal 202.

Figure 10A:
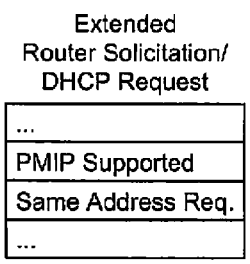
FIGS. 10A-10D are exemplary portions of extended address configuration messages according to the principles of the present disclosure.

Referring now to FIGS. 10A-10D, exemplary portions of extended address configuration messages are shown. In FIG. 10A, an extended message sent from a wireless terminal to a media access gateway is shown. For example, this message may be a router solicitation message and/or a DHCP message. The DHCP message may be known as a discover, request, or solicit message.

The message may include an indication of which mobility modes are supported, such as PMIP or CMIP. In addition, the message may indicate which mobility mode is preferred for the current connection. Further, the message may indicate which mobility mode will be preferred for future handoffs.

The message may also include an indication of whether the wireless terminal desires to be assigned the same address as the wireless terminal has been assigned before. For example, if the wireless terminal has two interfaces and wants to maintain continuity when switching from one interface to the other, the wireless terminal may request the same address when the second interface connects to a network. Alternatively, the wireless terminal may indicate that a different address is desired. For example only, the wireless terminal may be unable to assign the same address to both of its interfaces.

Figure 10B:
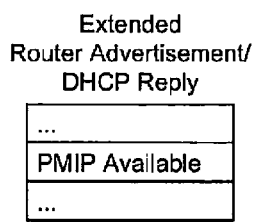

In FIG. 10B, an extended message sent from the media access gateway to the wireless terminal is shown. This message may be a router advertisement message and/or a DHCP message, such as an offer, acknowledgement, advertise, or reply message. The message may include indications of which mobility modes are allowed for the wireless terminal. For example, a flag may be included indicating that PMIP is available.

Figure 10C:
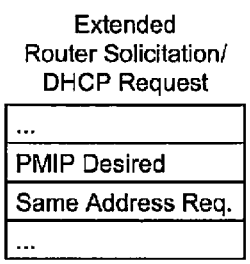

In FIG. 10C, an extended message sent from the wireless terminal to the media access gateway is shown. The message may be a router solicitation message or a DHCP message. The message may include an indication of the desired mobility mode of the wireless terminal. In addition, the message may indicate whether a different address or the same address is requested by the wireless terminal.

Figure 10D:
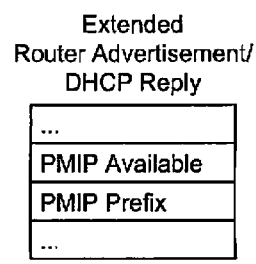

In FIG. 10D, an extended message is shown. For example, the message may be a router advertisement or a DHCP message. The message may indicate that PMIP is available and may include home address information. For example, this home address information may include a home address prefix and/or a home address. If the media access gateway is allowing the wireless terminal to conduct CMIP, the message may include a care-of address or care-of address prefix. Care-of address information may also be included in the message when PMIP is used.

Figure 11A:
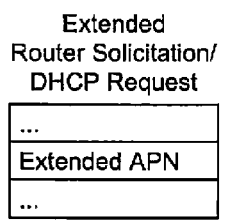
FIGS. 11A-11B are exemplary extended address configuration messages according to the principles of the present disclosure.
Figure 11B:
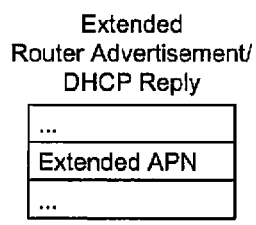
Figure 11C:
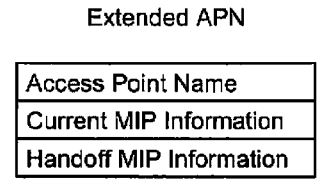
FIG. 11C is a representative field from the messages of FIGS. 11A-11B according to the principles of the present disclosure.

Referring now to FIGS. 11A-11C, exemplary extended address configuration messages are shown in FIGS. 11A-11B, while a representative field from these messages is shown in FIG. 11C. In FIG. 11A, an extended message, such as a router advertisement or DHCP request message, includes an extended access point name (APN) field. An APN is a unique identifier of a packet data network. The wireless terminal may provide an APN to a media access gateway so that the media access gateway knows to which PDN the wireless terminal desires to connect. An example of an extended APN is shown in FIG. 11C.

In FIG. 11B, an extended message, such as a router advertisement or DHCP reply, includes an extended APN field. In FIG. 11C, an exemplary extended APN is shown. The extended APN includes mobility information and may include the APN present in a standard APN field. For example only, the extended APN may include indications of which mobility types are supported and available.

In addition, information may be included to indicate a preference or availability of mobility types for use in a handoff situation. Handoff situations may occur when an interface of the wireless terminal switches from one media access gateway to another. In addition, a handoff may occur between interfaces of a wireless terminal having multiple interfaces. For example only, a wireless terminal may request PMIP for the current connection and CMIP for a handoff using two extended APNs: "local_domain:pmip" and "home_domain:cmip". If the media access gateway responds that either of these requests is not possible, the wireless terminal may adapt its mobility request.

The extended APN may also include an indication of whether the wireless terminal desires the same address to be assigned. Some or all of the information described with respect to the extended APN may be included in any message sent between the wireless terminal and the media access gateway. In various implementations, this information may be sent within messages that are already being exchanged for address configuration.

For example only, in this way, additional messages specific to mobility signaling are not necessary. Mobility information may be placed in preexisting options or fields. Alternatively, new fields, options, and sub-options may be defined to store this information.

Figure 12A:
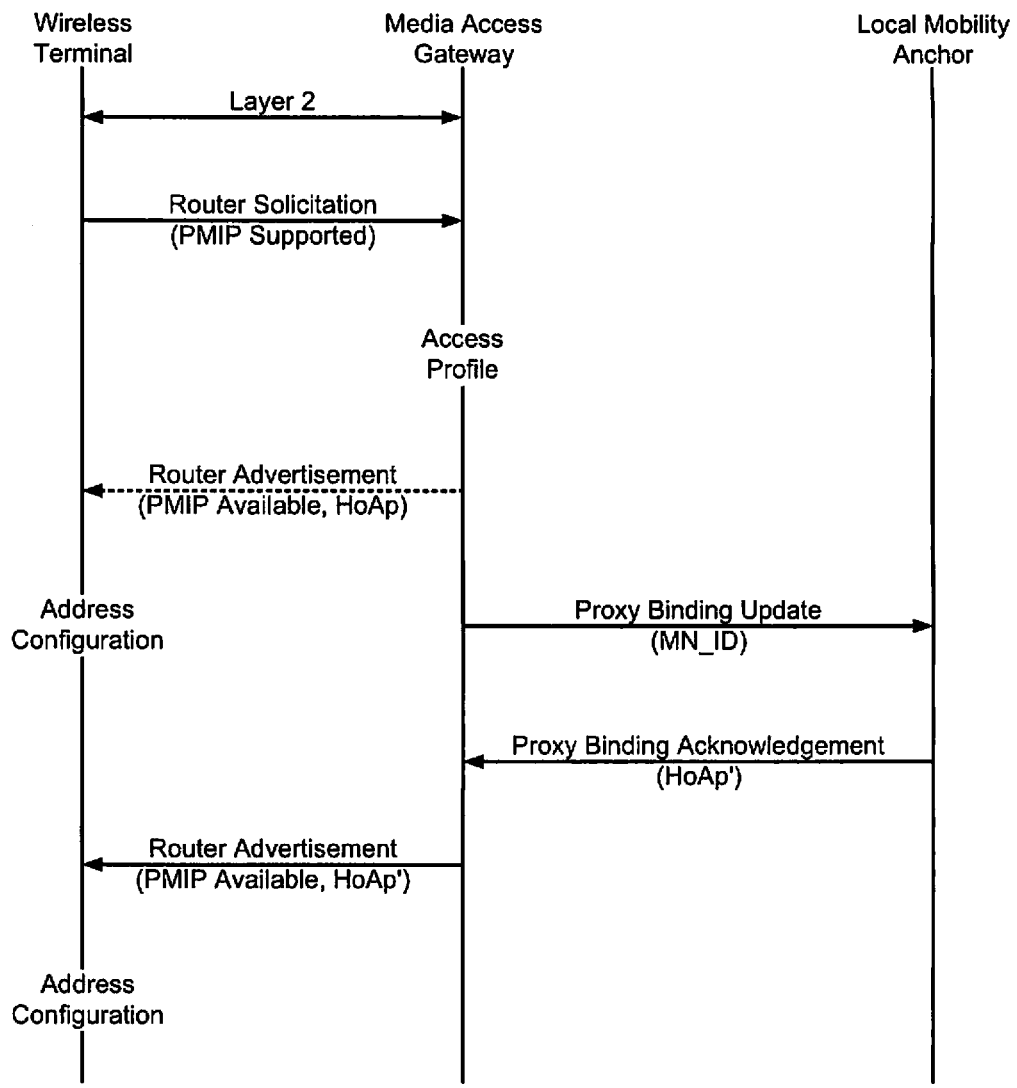
FIGS. 12A-12D are exemplary message flow diagrams according to the principles of the present disclosure.

Referring now to FIGS. 12A-12D, exemplary message flow diagrams are shown. In FIG. 12A, the wireless terminal establishes a layer 2 connection with a media access gateway (MAG). The wireless terminal broadcasts a router solicitation message indicating that the wireless terminal supports PMIP.

The MAG accesses a profile corresponding to the wireless terminal. In various implementations, the MAG may access the profile prior to receiving the router solicitation message. If the access profile includes a home address prefix for the wireless terminal, the MAG may transmit that home address prefix to the wireless terminal in a router advertisement message. The router advertisement message may also indicate whether PMIP can be provided by the MAG.

The MAG transmits a proxy binding update to a local mobility anchor (LMA), the address of which may have been included in the profile. The proxy binding update includes a unique identifier of the wireless terminal, such as a mobile node ID (MN_ID). The MAG may transmit the proxy binding update as soon as the profile is accessed. If the home address prefix is transmitted, the wireless terminal can perform autoconfiguration to generate a full IP address based on the prefix.

Meanwhile, the LMA responds with a proxy binding acknowledgement to the MAG. The proxy binding acknowledgement may include a home address prefix, which may differ from the prefix stored in the profile. A router advertisement message including the received home address prefix is then sent to the wireless terminal. This step may be skipped if the home address prefix received from the LMA has already been sent to the wireless terminal.

If the new home address prefix is transmitted, the wireless terminal then performs autoconfiguration based on the new home address prefix. In various scenarios, therefore, the wireless terminal may perform address autoconfiguration twice. Session continuity may be lost during the second autoconfiguration. However, latency is reduced by providing an address to the wireless terminal as soon as possible.

Figure 12B:
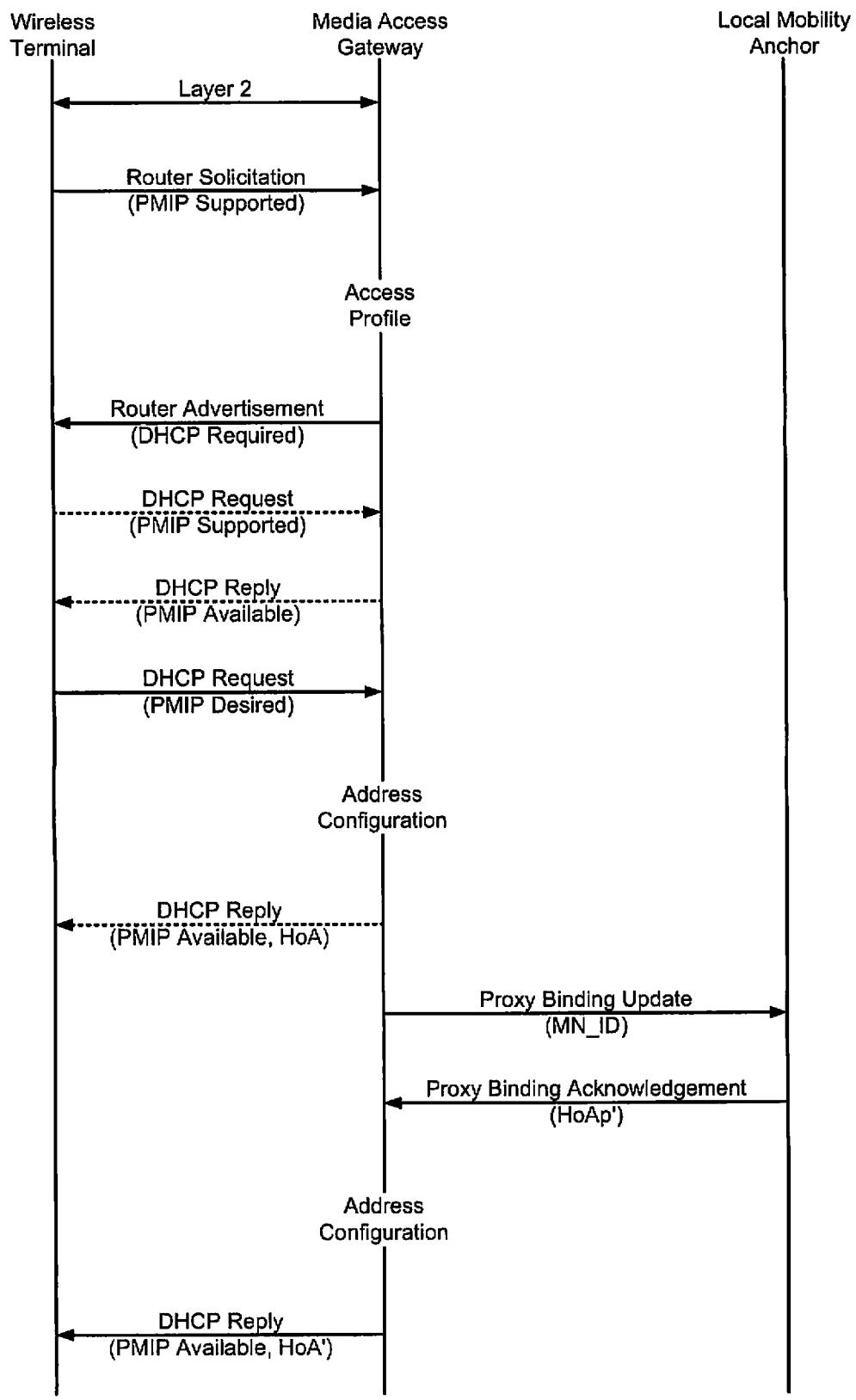

Referring now to FIG. 12B, a message flow diagram where the MAG requires the wireless terminal to use DHCP is presented. After establishing layer 2 connectivity, the wireless terminal broadcasts a router solicitation message to the MAG. The router solicitation message may include an indication that PMIP is supported and/or desired by the wireless terminal. The MAG may access the profile corresponding to the wireless terminal.

If autoconfiguration is not allowed for the wireless terminal, the MAG may transmit a router advertisement message to the wireless terminal indicating that DHCP is required. In various implementations, the indication that DHCP is required may be sent to any wireless terminal that connects to the MAG without first accessing the profile for the wireless terminal.

The wireless terminal then optionally sends a DHCP request to the MAG including an indication that PMIP is supported by the wireless terminal. The MAG optionally responds with a DHCP reply indicating that PMIP is available for the wireless terminal. The DHCP request and DHCP reply may be known as a DHCP discover and a DHCP offer, respectively.

The wireless terminal then sends a DHCP request to the MAG indicating that PMIP is desired. If the profile for the wireless terminal includes address information, the MAG can provide address information to the wireless terminal at this point. If the profile includes a prefix, the MAG may configure a full IP address based on the prefix. The MAG may then transmit a DHCP reply to the wireless terminal including this address.

The DHCP reply may also indicate that PMIP is available and will be provided for the wireless terminal. Meanwhile, the MAG sends a proxy binding update to the LMA. In various implementations, the MAG may send the proxy binding update as soon as the profile is accessed. The LMA responds with a proxy binding acknowledgement. The proxy binding acknowledgement may include updated address information, such as an updated address prefix. The MAG may form a full IP address based on the prefix information. This address is then transmitted to the wireless terminal in a DHCP reply. The DHCP reply may be omitted if the same address had already been sent in the earlier DHCP reply.

Figure 12C:
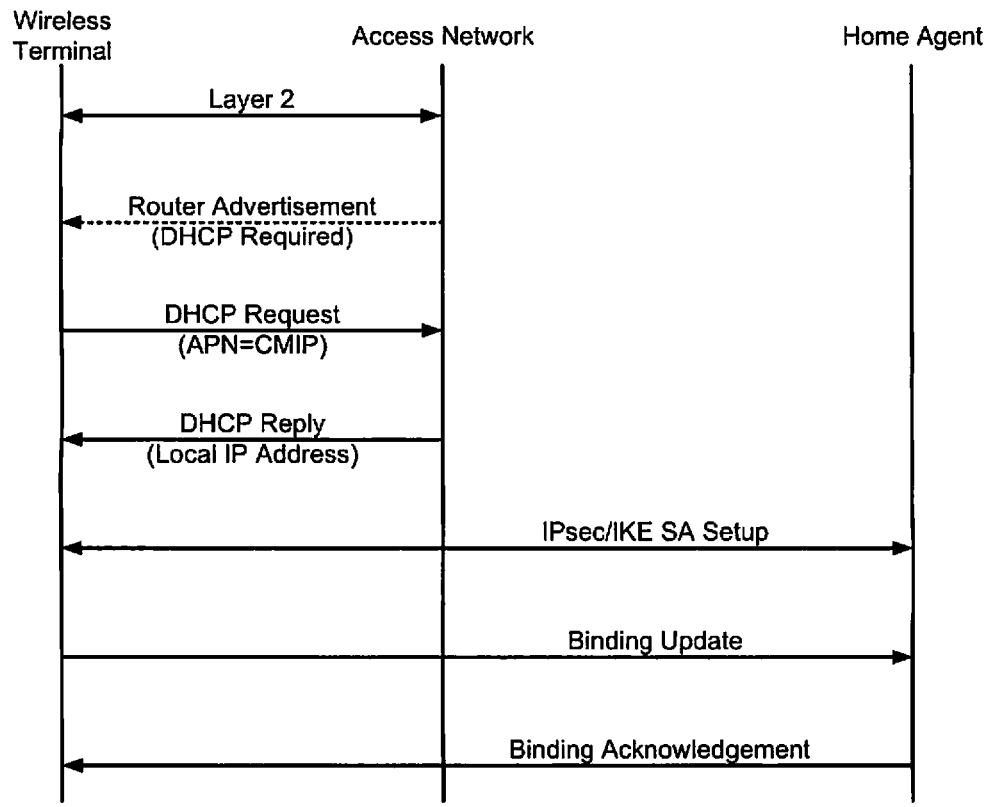

Referring now to FIG. 12C, a message flow diagram depicts a wireless terminal that requests CMIP. After the wireless terminal establishes layer 2 connectivity with an access network, the access network may send a router advertisement to the wireless terminal indicating that DHCP is required. This router advertisement may be preemptively sent before any router solicitation is received.

The wireless terminal broadcasts a DHCP request. The DHCP request may indicate that CMIP is desired. In various implementations, the indication of CMIP may be included in an extended APN. If the access network will allow the wireless terminal to use CMIP, the access network provides a local IP address to the wireless terminal in a DHCP reply.

This local IP address may be globally routable, and allows the wireless terminal to communicate with a home agent. The wireless terminal may establish an internet protocol security (IPsec) internet key exchange (IKE) security association (SA) with the home agent. After the SA is established, the wireless terminal transmits a binding update to the home agent. The home agent responds with a binding acknowledgement, which may include the home address assigned to the wireless terminal. The wireless terminal and the home agent then establish a tunnel for exchanging packets between the wireless terminal and a packet data network associated with the home agent.

Figure 12D:
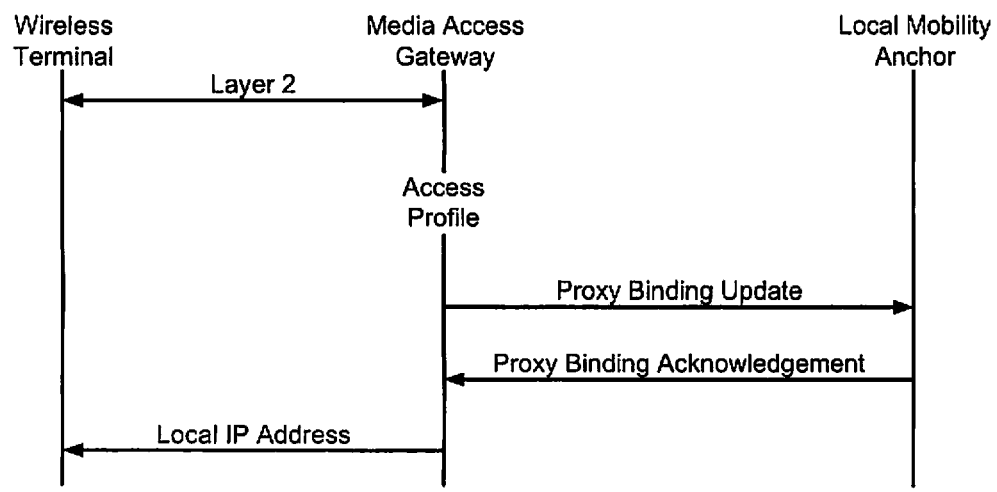

Referring now to FIG. 12D, an exemplary message flow diagram depicts a situation where the wireless terminal does not provide mobility information. First, layer 2 connectivity is established between the wireless terminal and the MAG. The wireless terminal may broadcast a router solicitation message and/or a DHCP request. Meanwhile, the MAG accesses the profile corresponding to the wireless terminal.

If the MAG does not receive any mobility information from the wireless terminal within a predetermined time period, the MAG may assume that PMIP should be provided to the wireless terminal. The MAG therefore sends a proxy binding update to the LMA. Once a proxy binding acknowledgement is received from the LMA, the MAG provides the assigned home address information to the wireless terminal. This home address information may include a home address prefix and/or a full home address. In various implementations, home address information found in the profile may have been sent to the wireless terminal prior to the proxy binding acknowledgement being received.

Figure 13:
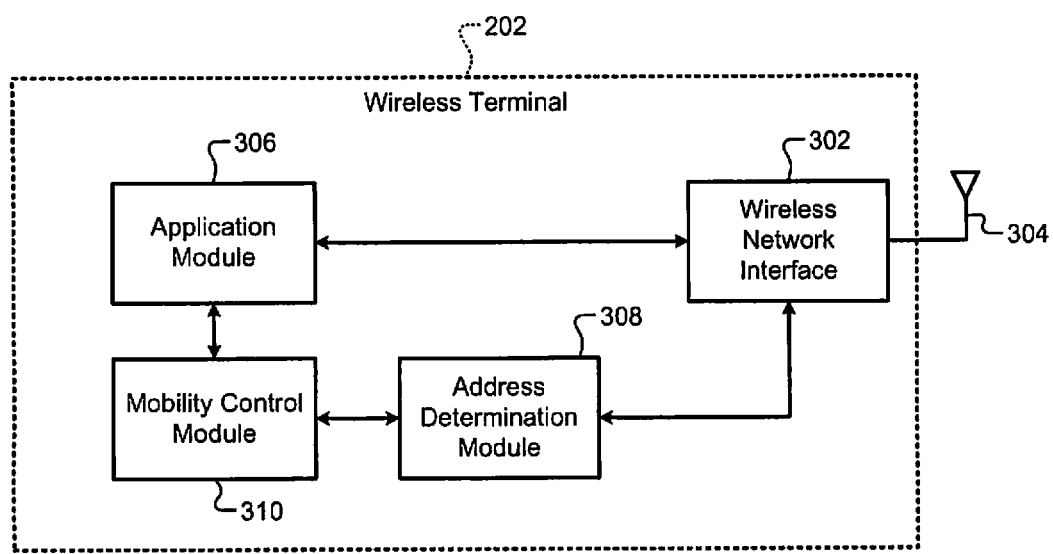
FIG. 13 is a functional block diagram of an exemplary implementation of the wireless terminal according to the principles of the present disclosure.

Referring now to FIG. 13, a functional block diagram of an exemplary implementation of the wireless terminal 202 is presented. The wireless terminal 202 includes a wireless network interface 302 that transmits and receives wireless signals using an antenna 304. An application module 306 sends and receives data using the wireless network interface 302. For example only, the application module 306 may transmit and receive voice over IP (VoIP) data, text messaging data, push e-mail data, world wide web browsing data, etc.

An address determination module 308 determines an address to be assigned to the wireless network interface 302. This address will be used as the source address for packets transmitted by the wireless network interface 302. The address determination module 308 may cause the wireless network interface 302 to transmit DHCP requests and/or router solicitation messages. Responses, such as DHCP replies and router advertisement messages, are sent to the address determination module 308.

A mobility control module 310 determines a desired mobility mode, and indicates this mode to the address determination module 308. The address determination module 308 then provides an indication of this desired mobility mode to the network to which the wireless network interface connects. The mobility control module may determine the desired mobility mode by consulting with the application module 306.

Figure 14A:
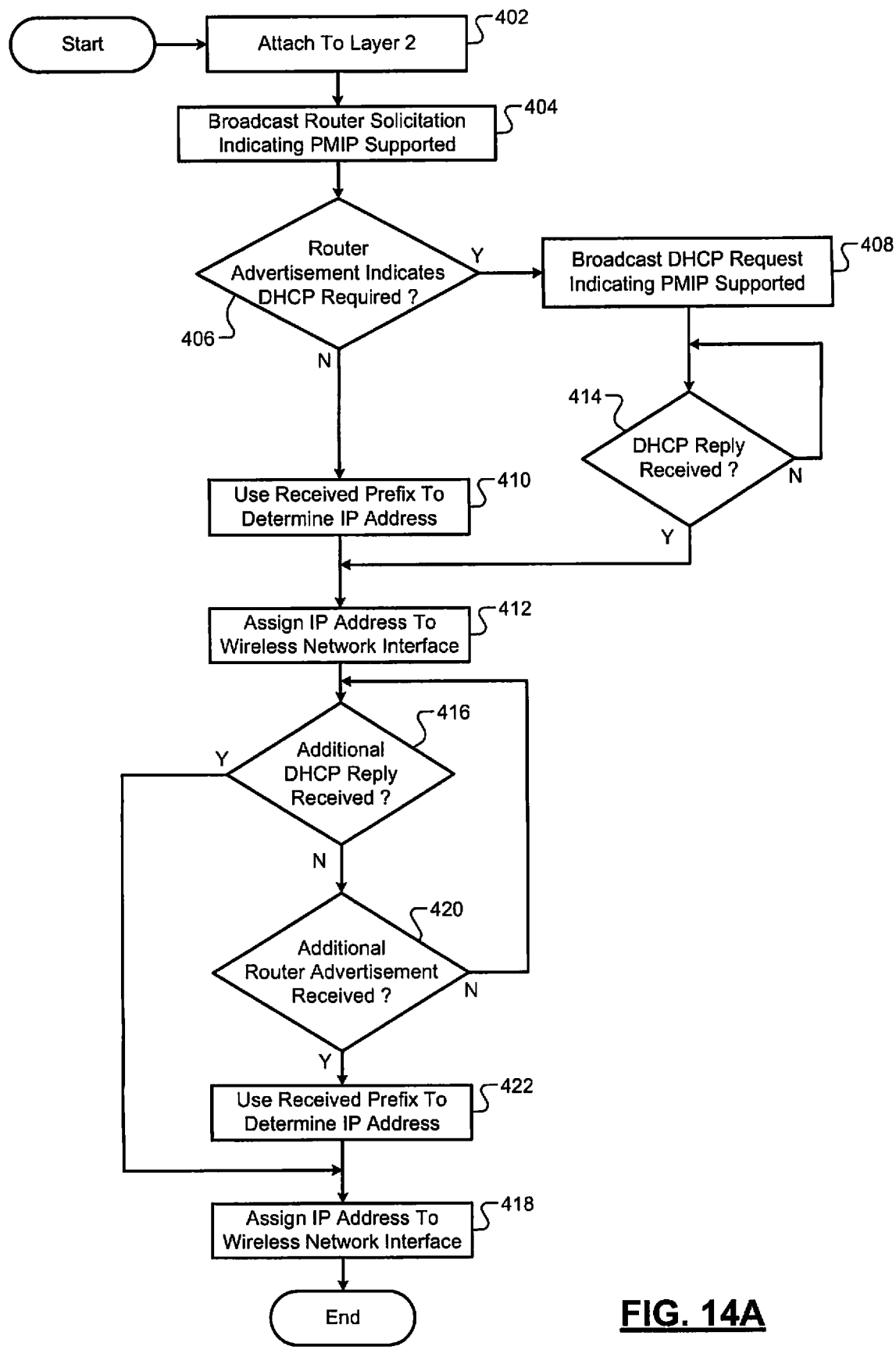
FIGS. 14A-14C are flowcharts depicting exemplary operation of a wireless terminal according to the principles of the present disclosure.
Figure 14B:
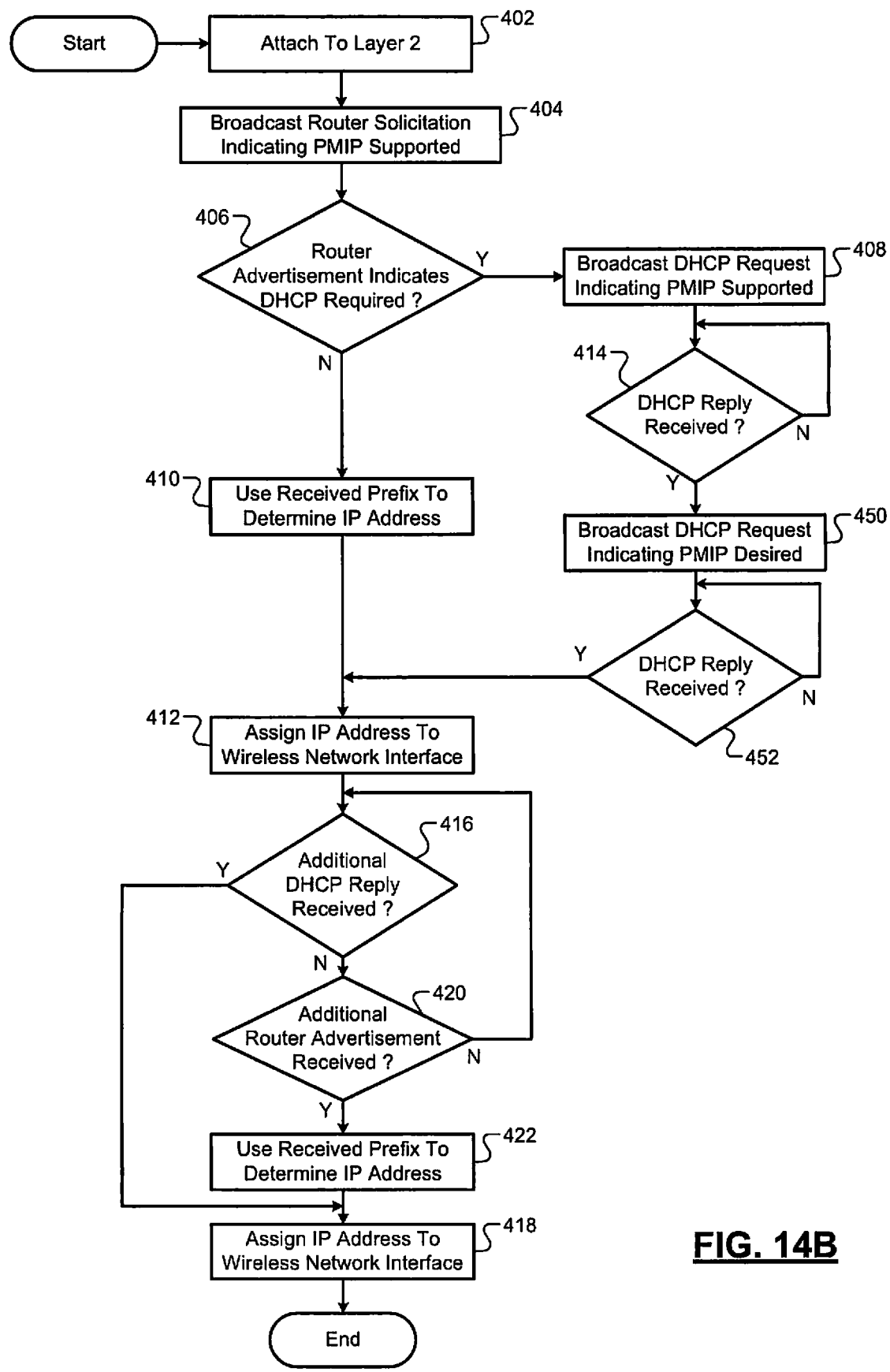
Figure 14C:
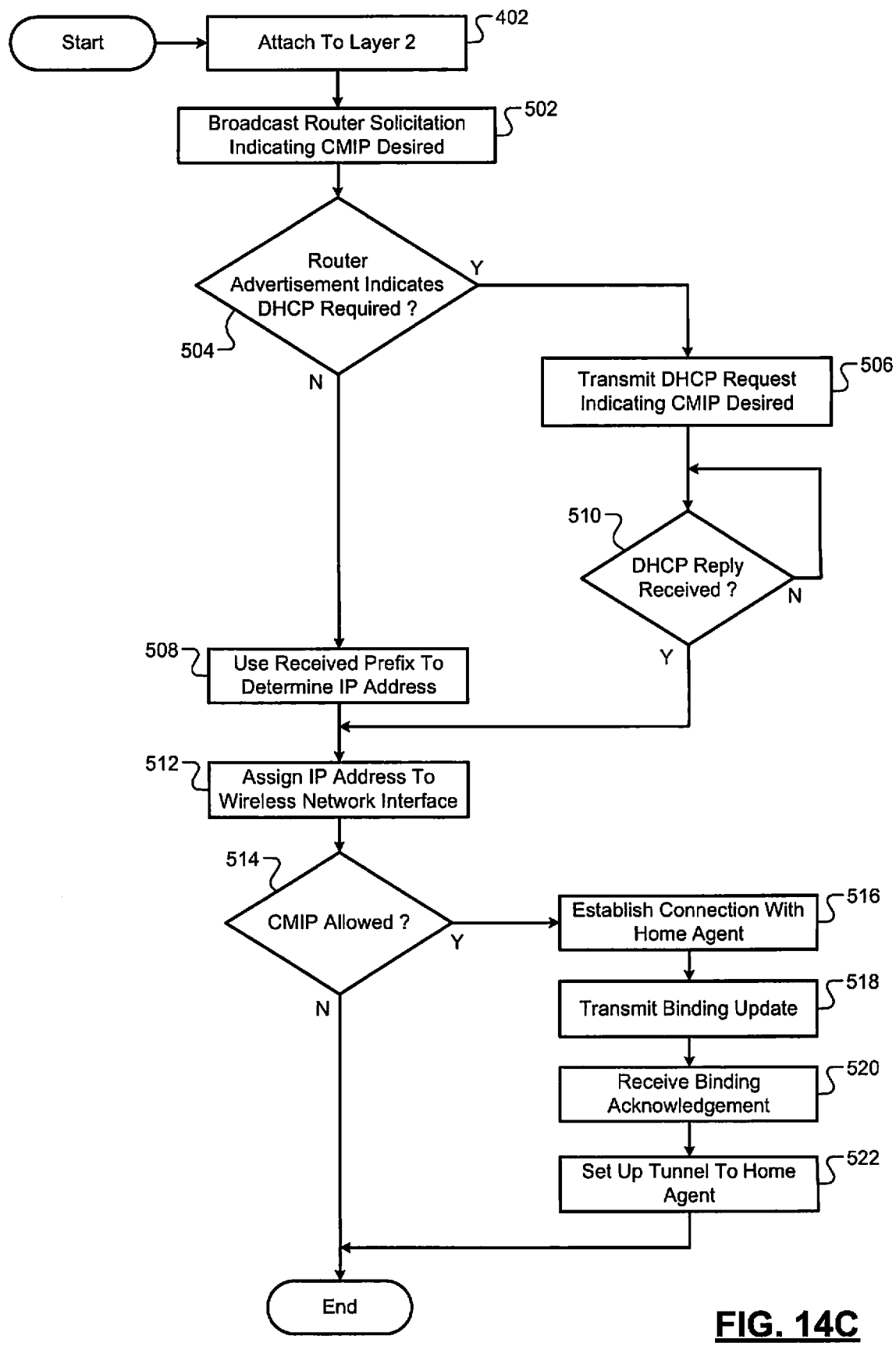

Referring now to FIGS. 14A-14C, flowcharts depict exemplary operation of a wireless terminal. In FIG. 14A, control begins in step 402, where layer 2 connectivity is established with the visited network. Control continues in step 404, where a router solicitation message is broadcast. The router solicitation message indicates that PMIP is supported by the wireless terminal. In various implementations, an indication that PMIP is supported may be equivalent to an indication that PMIP is desired by the wireless terminal.

Control continues in step 406, where control waits for a router advertisement message. If the router advertisement message indicates that DHCP is required, control transfers to step 408; otherwise, control transfers to step 410. In step 410, control uses the prefix received in the routing advertisement message to determine an IP address. Control then continues in step 412.

In step 408, control broadcasts a DHCP request indicating that PMIP is supported. Control continues in step 414, where control waits for a DHCP reply to be received. Once the DHCP reply is received, control transfers to step 412. In step 412, an IP address is assigned to the network interface of the wireless terminal. This address is either determined in step 410 or received in the DHCP reply in step 414.

Control continues in step 416, where control determines whether an additional DHCP reply has been received. If so, the additional DHCP reply includes a replacement address, and control transfers to step 418. Otherwise, control continues in step 420. In step 420, control determines whether an additional router advertisement message has been received. If so, the router advertisement includes a replacement prefix and control transfers to step 422. Otherwise, control returns to step 416. In step 422, control uses the prefix received in the router advertisement message to determine a new IP address. In step 418, control assigns the new IP address to the network interface of the wireless terminal. Control then ends.

Referring now to FIG. 14B, an exemplary flowchart depicts a two-stage DHCP message exchange. After the DHCP reply is received in step 414, control transfers to step 450. In step 450, control broadcasts a DHCP request indicating that PMIP is desired. In various implementations, the DHCP request may be transmitted directly to the media access gateway. Control then continues in step 452, where control waits for another DHCP reply to be received. Once the DHCP reply is received, control transfers to step 412. The DHCP reply received in step 452 includes the assigned address information, while the DHCP reply received in step 414 may simply include an indication of PMIP support.

Referring now to FIG. 14C, an exemplary flowchart depicts operation when the wireless terminal desires to use CMIP. Control begins in step 402, where layer 2 connectivity is established. Control continues in step 502, where a router solicitation message is broadcast indicating that CMIP is desired. Control continues in step 504, where control waits for a router advertisement to be received. If the router advertisement indicates that DHCP is required, control transfers to step 506; otherwise, control transfers to step 508.

In step 506, control transmits a DHCP request indicating that CMIP is desired. Control continues in step 510, where control waits for a DHCP reply to be received. Once the DHCP reply has been received, control transfers to step 512. In step 508, control determines an IP address based upon the prefix received in the router advertisement. Control continues in step 512.

In step 512, control assigns the IP address to the network interface of the wireless terminal. Control continues in step 514, where control determines whether CMIP is allowed. If so, control transfers to step 516 to begin direct contact with a home agent. Otherwise, CMIP is not allowed and mobility will be provided by the visited network, so control ends. Whether CMIP is allowed may be determined from received router advertisements and/or DHCP replies.

In step 516, control establishes a connection with the home agent. Control continues in step 518, where control transmits a binding update to the home agent. In step 520, control waits for a binding acknowledgement to be received. Control continues in step 522 where a tunnel is set up to the home agent. Control then ends.

Figure 15:
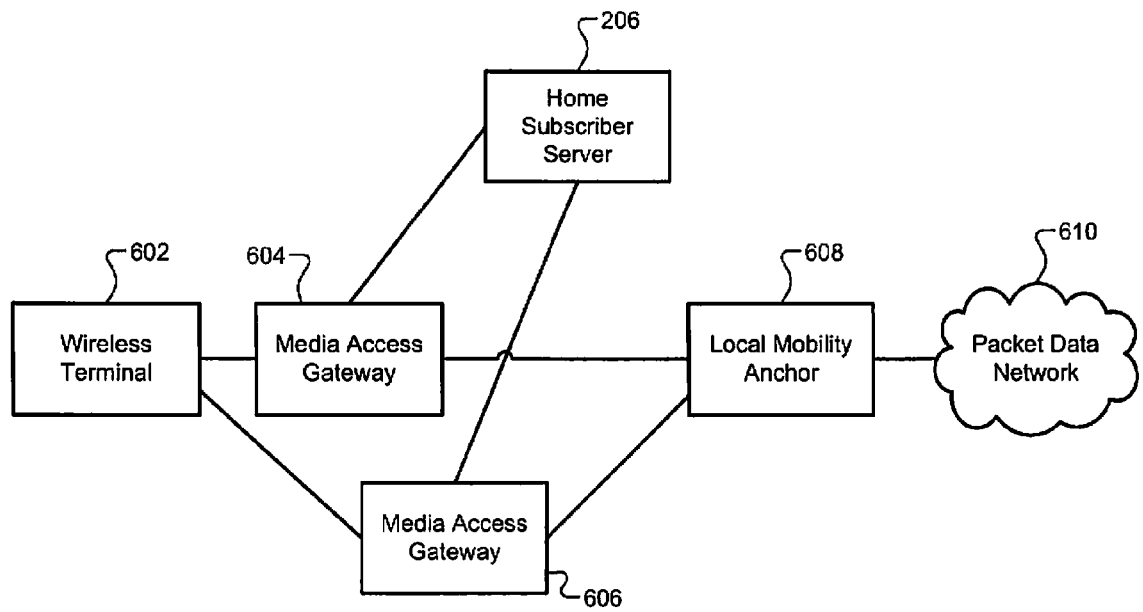
FIG. 15 is a functional block diagram of an exemplary communication system for a wireless terminal having multiple interfaces according to the principles of the present disclosure.

Referring now to FIG. 15, a functional block diagram of an exemplary communication system for a wireless terminal having multiple interfaces is depicted. A wireless terminal 602 includes two interfaces, which establish layer 2 connectivity with a first media access gateway (MAG) 604 and a second MAG 606. The first and second MAGs 604 and 606 may both provide proxy mobility for the wireless terminal 602 and connect to a local mobility anchor 608.

The first and second MAGs 604 and 606 may obtain profile information corresponding to the wireless terminal 602 from the home subscriber server (HSS) 206. The local mobility anchor 608 serves as a gateway to a packet data network 610. The multiple interfaces of the wireless terminal 602 may be of the same type, such as both being cellular interfaces. Alternatively, one interface may be cellular while another is a wireless local area network (such as WiFi, IEEE 802.11).

Figure 16:
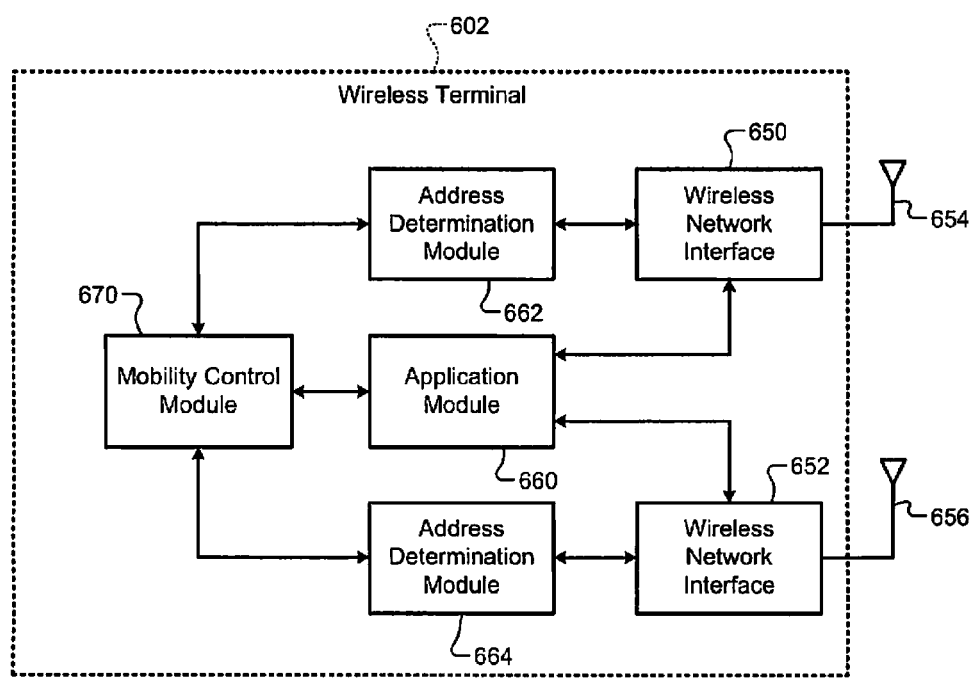
FIG. 16 is a functional block diagram of an exemplary implementation of the wireless terminal according to the principles of the present disclosure.

Referring now to FIG. 16, a functional block diagram of an exemplary implementation of the wireless terminal 602 is presented. The wireless terminal 602 includes first and second wireless network interfaces 650 and 652. The first and second wireless network interfaces 650 and 652 transmit and receive wireless signals using first and second antennas 654 and 656, respectively. In various implementations, a single antenna may be used for both the first and second wireless network interfaces 650 and 652.

An application module 660 sends and receives data via the first and second wireless network interfaces 650 and 652. First and second address determination modules 662 and 664 determine addresses assigned to the first and second wireless network interfaces 650 and 652, respectively. A mobility control module 670 provides information about supported and desired mobility modes to the first and second address determination modules 662 and 664.

Figure 17A:
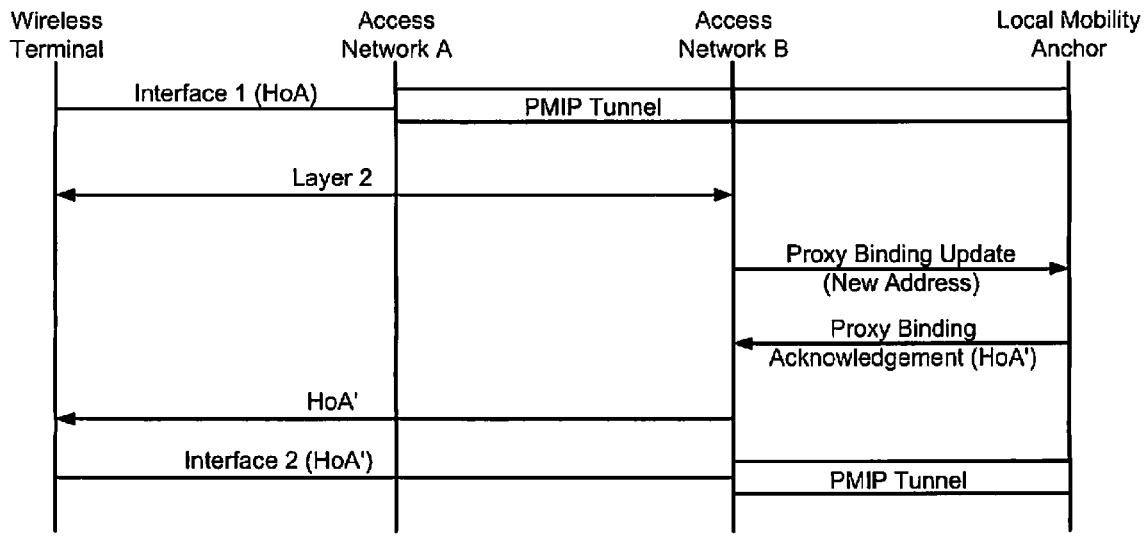
FIGS. 17A-17B are exemplary message flow diagrams for a multiple-interface wireless terminal according to the principles of the present disclosure.
Figure 17B:
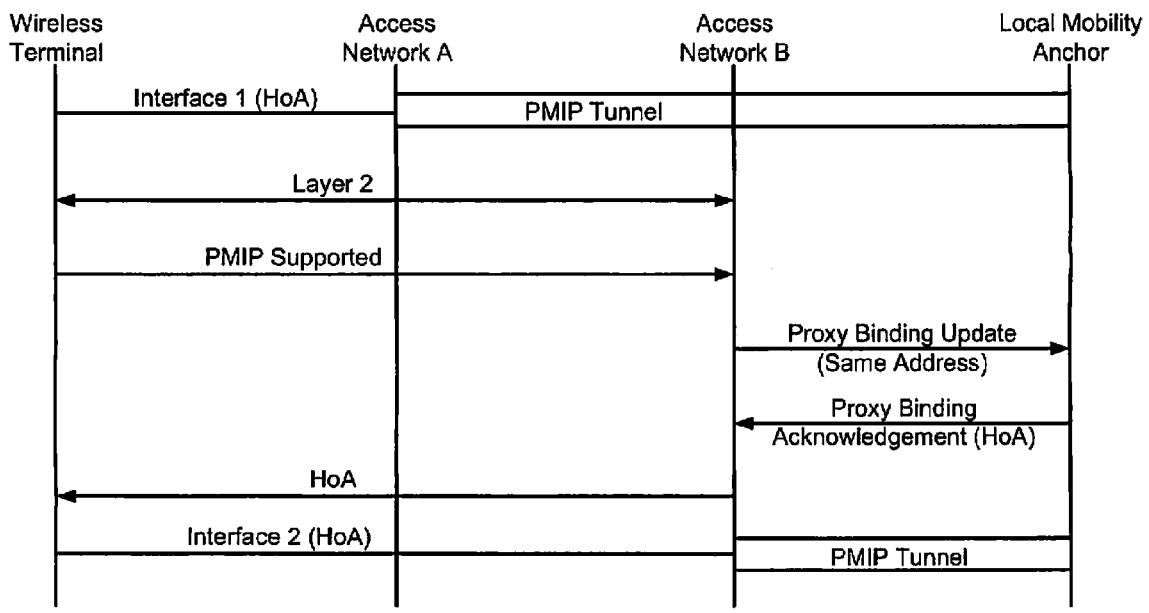

Referring now to FIGS. 17A-17B, exemplary message flow diagrams for a multiple-interface wireless terminal are presented. In FIG. 17A, a first interface of the wireless terminal has already established a PMIP connection with a first access network, access network A. Access network A therefore has a tunnel to a local mobility anchor (LMA) established.

A second interface of the wireless terminal then establishes layer 2 connectivity with a second access network, access network B. If access network B receives no mobility information from the wireless terminal, access network B may provide PMIP by default. Access network B may be able to request from the LMA the same address that is already assigned to interface 1. In this case, the address assigned to interface 1 is shown as HoA (home address).

Some wireless terminals may be unable to assign the same address to both interfaces. Other wireless terminals may enter an indeterminate state when the same address is assigned to both interfaces. Access network B may therefore request a new address from the LMA unless the wireless terminal has provided some indication that the same address should be assigned to the second interface.

Access network B then sends a proxy binding update to the LMA indicating that a new address should be assigned to the second interface of the wireless terminal. The LMA responds with a proxy binding acknowledgement including a new home address, HoA'. Access network B then provides HoA' to the wireless terminal. The wireless terminal then assigns the received home address (HoA') to the second interface, and a PMIP tunnel is established between access network B and the LMA.

In various implementations, the proxy binding acknowledgement may include an address prefix, which is used to configure a full address, instead of a full address. Address prefixes may be used with address autoconfiguration. When the first interface configured its address using autoconfiguration, the address likely included a unique interface identifier. Therefore, if the address for the second interface is also auto-configured, the different interface identifier for the second interface should lead to a different address being created, even if the same prefix is used. If the current address is determined by DHCP, as long as the MAG does not intentionally provide the address autoconfigured by the first interface, the second interface will have a different address.

Another scenario is where the first interface configured its address using DHCP. In this case, if the address for the second interface is autoconfigured, the unique interface identifier of the second interface should result in a new address being configured. Only in the case where the addresses of both the first and second interfaces are configured with DHCP could the interfaces inadvertently receive the same address. This is the situation that the MAG may avoid if no explicit indication is received from the wireless terminal regarding whether the two addresses can be the same.

In various implementations, access network B may not determine whether a new address or the same address should be assigned to the wireless terminal. The LMA, however, may realize that a first interface has already established connectivity. The LMA may therefore decide whether to assign the same address or address prefix to the second interface. For example only, this decision may be based upon profile information for the wireless terminal. If the profile indicates that the wireless terminal can accommodate the same address on multiple interfaces, the LMA may provide the same address information to access network B that was provided to access network A.

Referring now to FIG. 17B, the first interface of the wireless terminal has already established a connection with access network A when the second interface of the wireless terminal establishes layer 2 connectivity with access network B. In FIG. 17B, however, the wireless terminal indicates to access network B that PMIP is supported. Indicating that PMIP is supported may also serve as an indication that the wireless terminal can accommodate the same address and multiple interfaces.

Alternatively, an additional piece of information may be sent from the wireless terminal to the access network B to indicate that the same address can be used. Access network B therefore transmits a proxy binding update to the LMA indicating that the same address should be provided. The LMA responds to the proxy binding acknowledgement, which may include the same address (HoA) that was provided to access network A.

Figure 18:
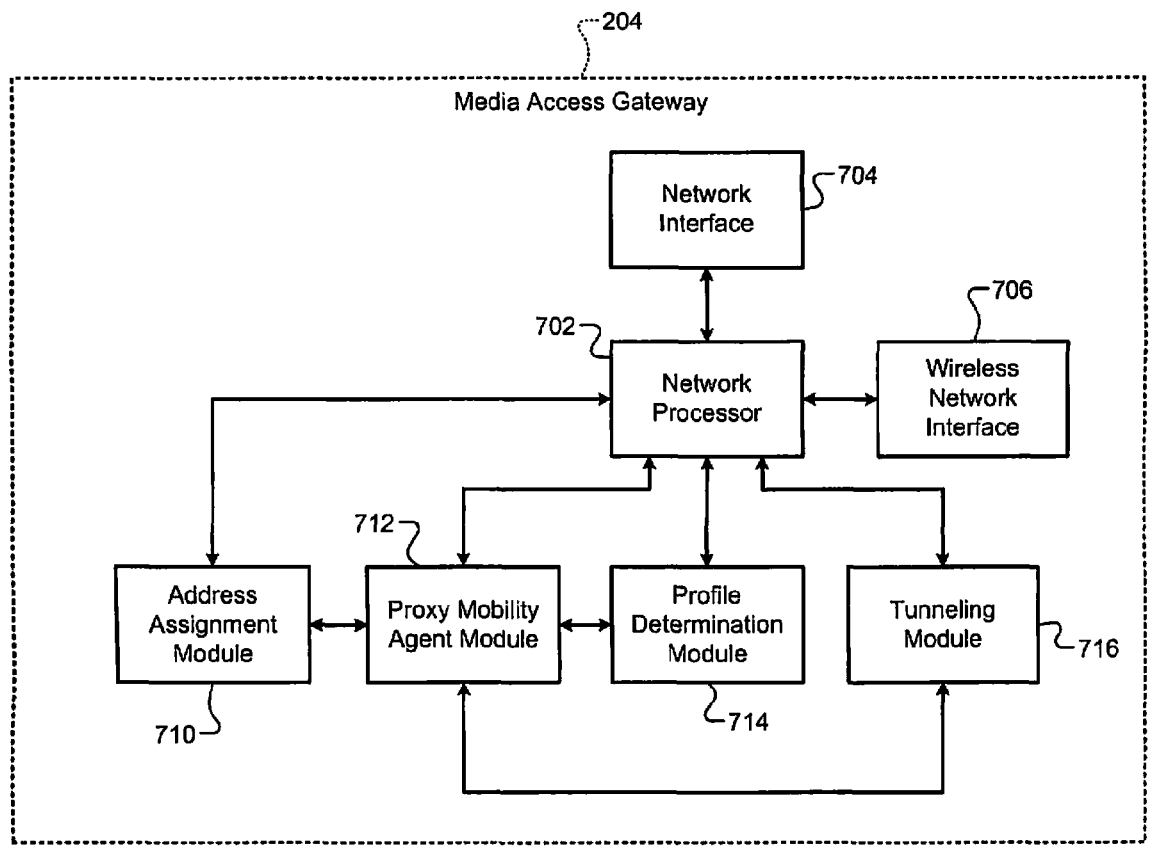
FIG. 18 is a functional block diagram of an exemplary implementation of the media access gateway according to the principles of the present disclosure.

Referring now to FIG. 18, a functional block diagram of an exemplary implementation of the MAG 204 is presented. The MAG 204 includes a network processor 702 that communicates with a packet data network via a network interface 704.

A wireless network interface 706 communicates with a wireless terminal via an antenna (not shown).

The MAG 204 also includes an address assignment module 710, a proxy mobility agent (PMA) module 712, a profile determination module 714, and a tunneling module 716. The address assignment module 710 processes messages, such as DHCP requests and router solicitation messages.

The address assignment module 710 also generates messages, such as DHCP replies and router advertisement messages. In various implementations, the address assignment module 710 may send and receive extended versions of these messages, such as are shown in FIGS. 10A-11B. The address assignment module 710 provides information regarding the mobility capability and preferences of the wireless terminal through the PMA module 712.

The PMA module 712 indicates to the address assignment module 710 the mobility capabilities of the MAG 204. The address assignment module 710 may include these capabilities in messages transmitted to the wireless terminal. The PMA module 712 may determine which mobility modes are allowed for the wireless terminal based on profile information from the profile determination module 714.

The profile determination module 714 may obtain profile information for the wireless terminal from a remote source, such as a home subscriber server. The profile information may be indexed by a unique identifier of the wireless terminal. Additional profile information may correspond to the network in which the MAG 204 resides and/or profile information relating to the relationship between that network and a home network of the wireless terminal. The PMA module 712 establishes a tunnel between the MAG 204 and one or more LMAs using the tunneling module 716.

Figure 19A:
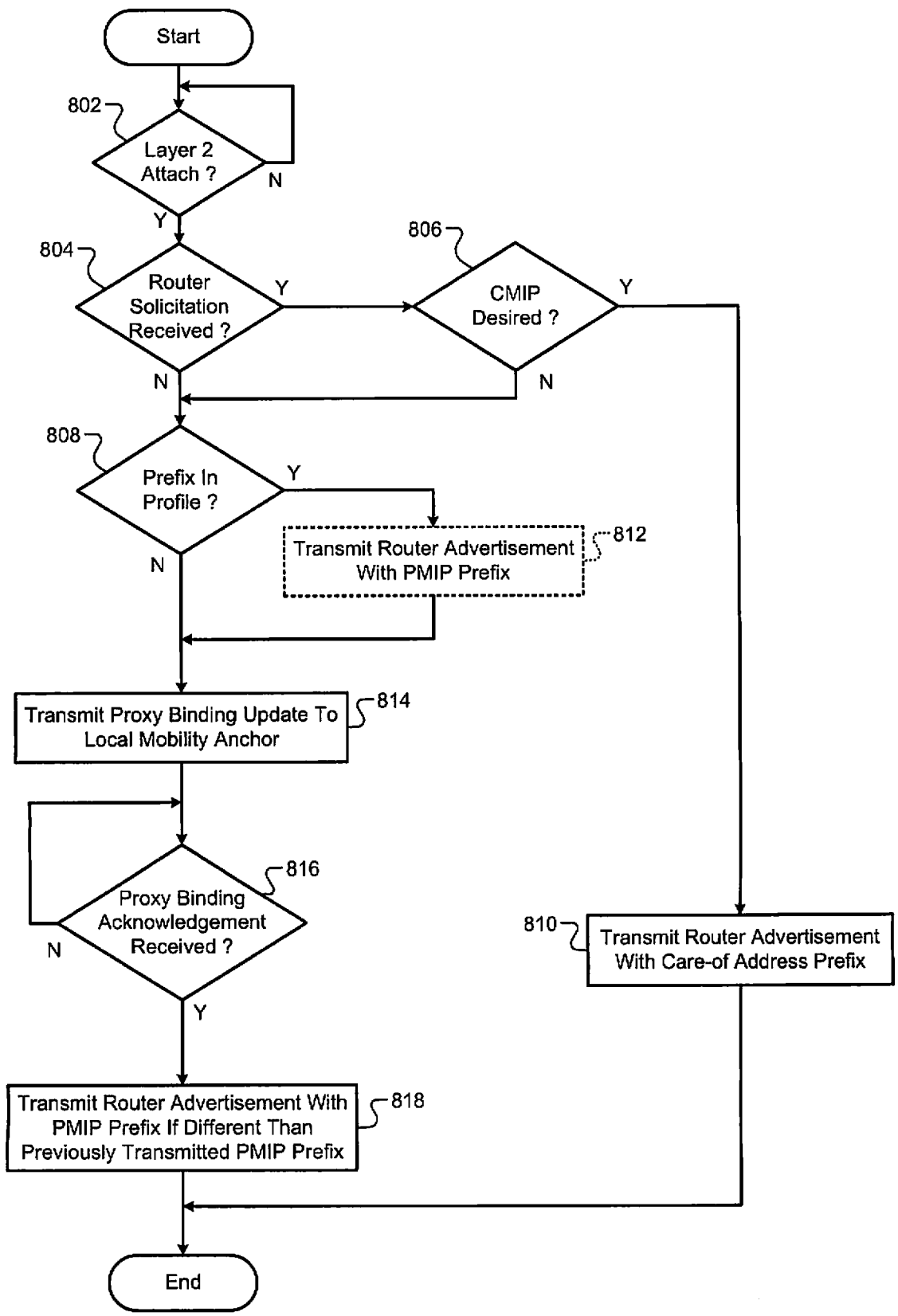
FIGS. 19A-19B are flowcharts depicting exemplary operation of a media access gateway according to the principles of the present disclosure.
Figure 19B:
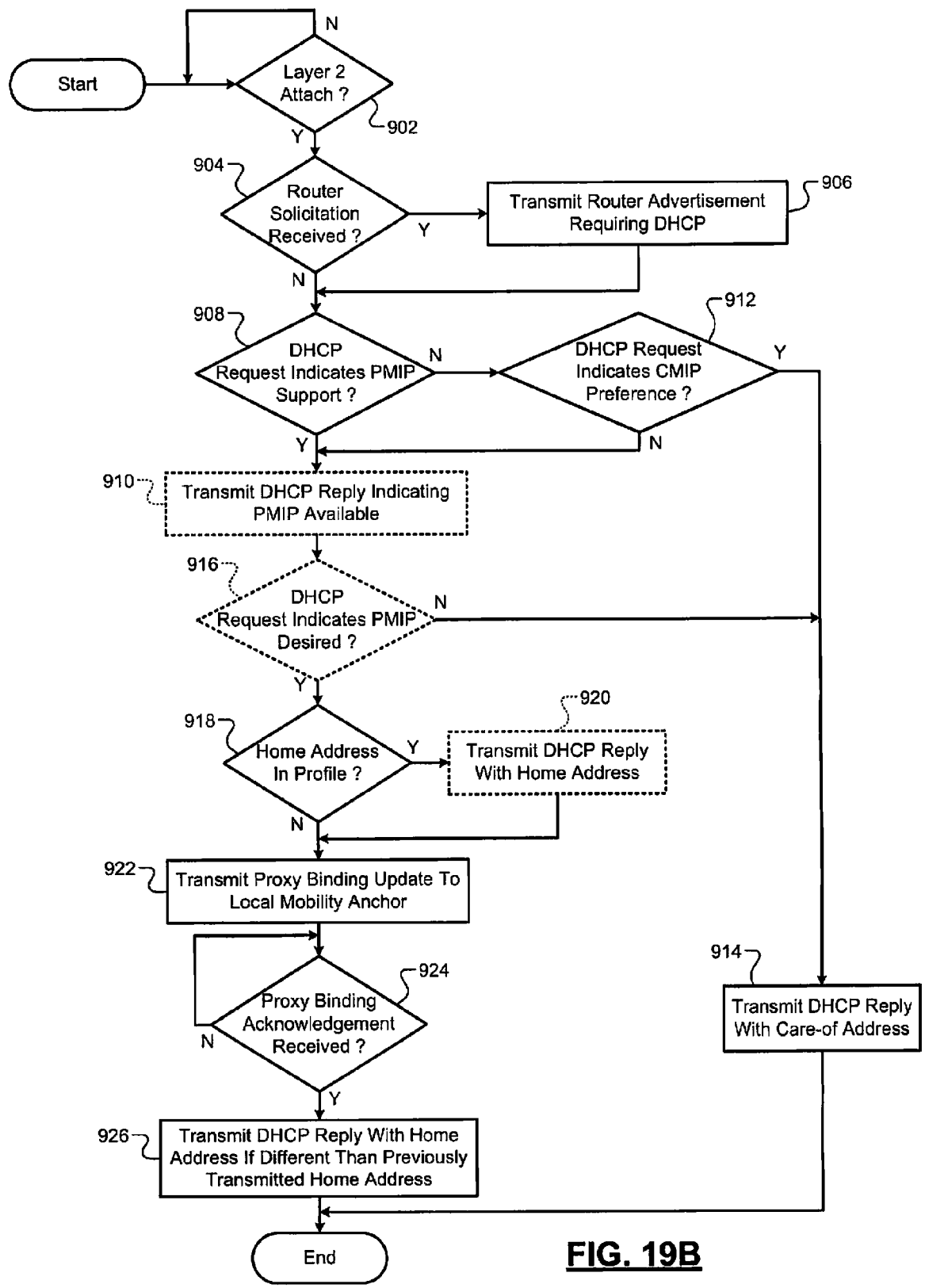

Referring now to FIGS. 19A-19B, flowcharts depict exemplary operation of the media access gateway. In FIG. 19A, control begins in step 802, where control waits for layer 2 connectivity to be established by the wireless terminal. Control then transfers to step 804. In step 804, control determines whether a router solicitation message has been received. If so, control transfers to step 806; otherwise, control transfers to step 808.

Control may wait a predetermined period of time before transferring to step 808. After that predetermined period of time, control may assume that no router solicitation will be received and that proxy mobility should be provided. In step 806, control determines whether the router solicitation message indicated that CMIP was desired by the wireless terminal. If so, control transfers to step 810; otherwise, control transfers to step 808. If no mobility information is included in the router solicitation message, control may also transfer to step 808.

In step 810, control transmits a router advertisement message to the wireless terminal. The router advertisement message includes a care-of address prefix from which the wireless terminal can create a care-of address. Using that care-of address, the wireless terminal can communicate with a home agent. Control then ends.

In step 808, control determines whether the prefix information for the wireless terminal is stored in the wireless terminal's profile. If so, control transfers to step 812. Otherwise, control transfers to step 814. In step 812, control optionally transmits a router advertisement message including the prefix information from the profile. Control continues in step 814. In step 814, control transmits a proxy binding update to the LMA corresponding to the wireless terminal.

Control continues in step 816, where control remains until a proxy binding acknowledgement is received. Control then transfers to step 818. In step 818, control transmits a router advertisement to the wireless terminal. Step 818 may be skipped if a router advertisement message was transmitted in step 812 and the address information received in the proxy binding update does not differ from what was transmitted in step 812. Control then ends.

Referring now to FIG. 19B, control begins in step 902, where control remains until layer 2 connectivity is established with the wireless terminal. Control then transfers to step 904, where control determines if a router solicitation message has been received. If so, control transfers to step 906; otherwise, control transfers to step 908. If after a predetermined period of time no router solicitation is received, control may transfer to step 908.

In step 906, a router advertisement message indicating that DHCP is required is sent in response to the router solicitation message. Control then continues in step 908. In step 908, control waits for a DHCP request to be received. Once the DHCP request is received, control determines whether that request indicates PMIP support. If so, control transfers to step 910; otherwise, control transfers to step 912.

In step 912, control determines whether the DHCP request indicates a preference for CMIP. If so, control transfers to step 914; otherwise, control transfers to step 910. Control transfers to step 910 because the DHCP request does not indicate either PMIP or CMIP support, and therefore PMIP will be provided.

In step 914, control transmits a DHCP reply including a care-of address. Control then ends. In step 910, control transmits a DHCP reply indicating that PMIP is available for a wireless terminal. Control then continues in step 916, where control waits for a DHCP request to be received. If the request indicates that PMIP is desired, control transfers to step 918; otherwise, control transfers to step 914. Steps 910 and 916 may be omitted, and the wireless terminal therefore does not have to confirm its desire to use PMIP.

In step 918, control determines whether home address information is stored in the profile corresponding to the wireless terminal. If so, control transfers to step 920; otherwise, control transfers to step 922. In step 920, home address information is already known, and it may therefore be transmitted to the wireless terminal. Control then continues in step 922.

In step 922, control transmits a proxy binding update to the LMA corresponding to the wireless terminal. Control continues in step 924, where control waits for the proxy binding acknowledgement to be received. Once the proxy binding acknowledgement is received, control transfers to step 926. In step 926, control transmits a DHCP reply including the received home address information to the wireless terminal. Control may omit step 926 when the received home address information does not differ from information already transmitted in step 920.

Figure 20:
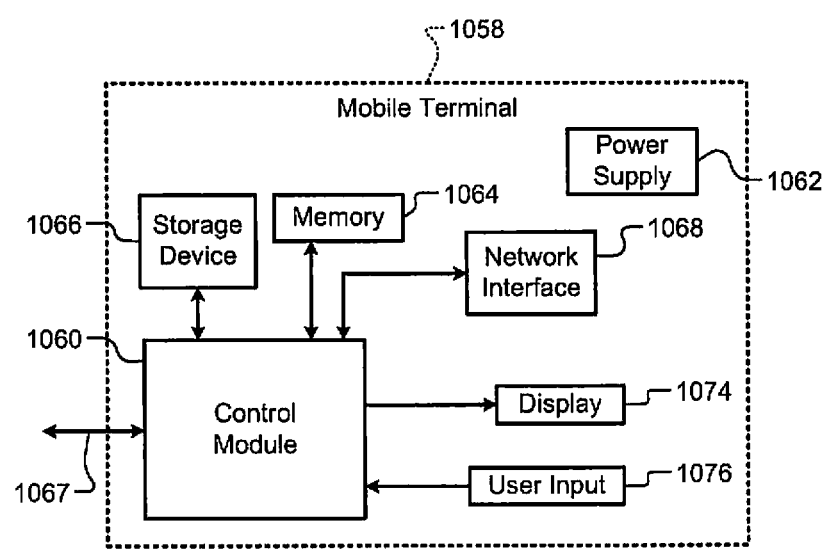
FIG. 20 is a functional block diagram of a mobile terminal according to the principles of the present disclosure.

Referring now to FIG. 20, the teachings of the disclosure can be implemented in a control module 1060 of a mobile terminal 1058. The mobile terminal 1058 includes the control module 1060, a power supply 1062, memory 1064, a storage device 1066, and a wireless network interface 1067. The mobile terminal 1058 may optionally include a network interface 1068, a microphone, an audio output such as a speaker and/or output jack, a display 1074, and a user input device 1076 such as a keypad and/or pointing device. If the network interface 1068 includes a wireless local area network interface, an antenna (not shown) may be included.

The control module 1060 may receive input signals from the wireless network interface 1067, the network interface 1068, the microphone, and/or the user input device 1076. The control module 1060 may process signals, including encoding, decoding, filtering, and/or formatting, and generate output signals. The output signals may be communicated to one or more of memory 1064, the storage device 1066, the wireless network interface 1067, the network interface 1068, and the audio output.

Memory 1064 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 1066 may include an optical storage drive, such as a DVD drive, and/or a hard disk drive (HDD). The power supply 1062 provides power to the components of the mobile terminal 1058. The teachings of the disclosure can be implemented similarly in other devices such as a personal digital assistant, a media player, a laptop computer, a gaming console, or other mobile computing device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A media access gateway comprising:
a wireless network interface configured to establish a wireless link with a wireless terminal;
an address assignment module configured to receive an address request message from the wireless terminal, the address request message including a mobility signal;
a proxy mobility agent module configured to (i) selectively transmit a proxy binding update to a local mobility anchor, and (ii) receive a proxy binding acknowledgement from the local mobility anchor; and
a profile module configured to retrieve a profile corresponding to the wireless terminal from a server,
wherein the address assignment module is configured to selectively transmit an address assignment message to the wireless terminal in response to the mobility signal indicating at least one of (i) support for proxy mobility or (ii) a preference for proxy mobility,
wherein the address assignment message is based on address information in the proxy binding acknowledgement, and
wherein the address assignment module is configured to, in response to the profile including address information for the wireless terminal, transmit a second address assignment message to the wireless terminal based on the address information in the profile.

2. The media access gateway of claim 1, wherein:
the address request message comprises at least one of a dynamic host configuration protocol (DHCP) message and a router solicitation message; and
the address assignment message comprises at least one of a DHCP message and a router advertisement message.

3. The media access gateway of claim 1, wherein the proxy mobility agent module is configured to, in response to the address information in the proxy binding acknowledgement matching the address information in the profile, omit transmitting the address assignment message.

4. The media access gateway of claim 1, wherein the proxy mobility agent module is configured to determine an address of the local mobility anchor from the profile.

5. The media access gateway of claim 1, wherein the address assignment module is configured to receive a second address request message prior to receiving the address request message, and wherein the second address request message includes a mobility request signal.

6. The media access gateway of claim 5, wherein the address assignment module is configured to, in response to receiving the second address request message, transmit a second address assignment message to the wireless terminal, wherein the second address assignment message includes a mobility availability signal.

7. The media access gateway of claim 1, wherein the address request message includes an extended access point name (APN) field, and wherein the extended APN field includes the mobility signal and an APN that identifies a packet data network connected to the local mobility anchor.

8. The media access gateway of claim 1, wherein the address assignment message includes an extended access point name (APN) field, wherein the extended APN field includes a mobility availability signal and an APN that identifies a packet data network connected to the local mobility anchor.

9. A communications system comprising:
the media access gateway of claim 1; and
a wireless terminal comprising:
a second wireless network interface; and
an address determination module configured to (i) transmit the address request message via the second wireless network interface, and (ii) receive the address assignment message via the second wireless network interface.

10. The communications system of claim 9, wherein the wireless terminal further comprises a third wireless network interface, wherein the address determination module includes a same address signal in the address request message, wherein the same address signal indicates that the second and third wireless network interfaces can be assigned a single address, and wherein the proxy mobility agent module is configured to forward the same address signal to the local mobility anchor.

11. A method comprising:
establishing a wireless link with a wireless terminal;
receiving an address request message from the wireless terminal, the address request message including a mobility signal;
selectively transmitting a proxy binding update to a local mobility anchor;
receiving a proxy binding acknowledgement from the local mobility anchor;
selectively transmitting an address assignment message to the wireless terminal in response to the mobility signal indicating at least one of (i) support for proxy mobility or (ii) a preference for proxy mobility;
retrieving a profile corresponding to the wireless terminal from a server; and
in response to the profile including address information for the wireless terminal, transmitting a second address assignment message to the wireless terminal based on the address information in the profile,
wherein the address assignment message is based on address information in the proxy binding acknowledgement.

12. The method of claim 11, wherein:
the address request message comprises at least one of a dynamic host configuration protocol (DHCP) message and a router solicitation message; and
the address assignment message comprises at least one of a DHCP message and a router advertisement message.

13. The method of claim 11, further comprising, in response to the address information in the proxy binding acknowledgement matching the address information in the profile, omitting transmitting the address assignment message.

14. The method of claim 11, further comprising determining an address of the local mobility anchor from the profile.

15. The method of claim 11, further comprising receiving a second address request message including a mobility request signal prior to receiving the address request message.

16. The method of claim 15, further comprising, in response to receiving the second address request message, transmitting a second address assignment message to the wireless terminal, wherein the second address assignment message includes a mobility availability signal.

17. The method of claim 11, wherein the address request message includes an extended access point name (APN) field, and wherein the extended APN field includes the mobility signal and an APN that identifies a packet data network connected to the local mobility anchor.

18. The method of claim 11, wherein the address assignment message includes an extended access point name (APN) field, wherein the extended APN field includes a mobility availability signal and an APN that identifies a packet data network connected to the local mobility anchor.

19. The method of claim 11, further comprising:
including a same address signal in the address request message, wherein the same address signal indicates that multiple wireless network interfaces of the wireless terminal can be assigned a single address; and
forwarding the same address signal to the local mobility anchor.

20. A computer program stored on a non-transitory computer-readable medium for use by a processor, the computer program comprising:
establishing a wireless link with a wireless terminal;
receiving an address request message from the wireless terminal, the address request message including a mobility signal;
selectively transmitting a proxy binding update to a local mobility anchor;
receiving a proxy binding acknowledgement from the local mobility anchor;
selectively transmitting an address assignment message to the wireless terminal in response to the mobility signal indicating at least one of (i) support for proxy mobility or (ii) a preference for proxy mobility;
retrieving a profile corresponding to the wireless terminal from a server; and
in response to the profile including address information for the wireless terminal, transmitting a second address assignment message to the wireless terminal based on the address information in the profile,
wherein the address assignment message is based on address information in the proxy binding acknowledgement.

* * * * *